(12) United States Patent
Ghajar

(10) Patent No.: US 10,365,714 B2
(45) Date of Patent: Jul. 30, 2019

(54) SYSTEM AND METHOD FOR DYNAMIC CONTENT DELIVERY BASED ON GAZE ANALYTICS

(71) Applicant: Sync-Think, Inc., Palo Alto, CA (US)

(72) Inventor: Jamshid Ghajar, Palo Alto, CA (US)

(73) Assignee: SYNC-THINK, INC., Palo Alto, CA (US)

( * ) Notice: Subject to any disclaimer, the term of this patent is extended or adjusted under 35 U.S.C. 154(b) by 0 days.

(21) Appl. No.: 15/967,440

(22) Filed: Apr. 30, 2018

(65) Prior Publication Data

US 2018/0314328 A1 Nov. 1, 2018

Related U.S. Application Data

(63) Continuation of application No. 14/530,598, filed on Oct. 31, 2014, now Pat. No. 9,958,939.

(Continued)

(51) Int. Cl.
*G06F 3/0482* (2013.01)
*G06F 3/01* (2006.01)
*G06F 3/00* (2006.01)

(52) U.S. Cl.
CPC ............ *G06F 3/013* (2013.01); *G06F 3/005* (2013.01); *G06F 3/0482* (2013.01); *G06F 2203/011* (2013.01)

(58) Field of Classification Search
CPC .... G06F 2203/011; G06F 3/005; G06F 3/013; G06F 3/0482

(Continued)

(56) References Cited

U.S. PATENT DOCUMENTS

| | | |
|---|---|---|
| 4,332,566 A | 6/1982 | Mazeski et al. |
| 4,407,299 A | 10/1983 | Culver |

(Continued)

FOREIGN PATENT DOCUMENTS

| | | |
|---|---|---|
| EP | 1726260 | 11/2006 |
| EP | 2095759 A1 | 9/2009 |
| GB | 2496005 | 1/2013 |

OTHER PUBLICATIONS

Ball, "The Role of Higher-Order Motor Areas in Voluntary Movement as Revealed by High-Resolution EEG and fMRI," NeuroImage 10, 662-694 (1999), Article ID nimg.1999-0507, available online at http://www.idealibrary.com, 13 pgs.

(Continued)

*Primary Examiner* — Tony O Davis
(74) *Attorney, Agent, or Firm* — Morgan, Lewis & Bockius LLP

(57) ABSTRACT

A method of presenting content to a subject based on eye position measurements includes presenting the subject with content. While presenting the content to the subject, one or more of the subject's eye positions is measured. The method includes continuously performing the operations of: generating an attention metric using the one or more measured eye positions; based on the attention metric, determining an attention state of the subject; and determining a trajectory of the one or more eye positions. In accordance with detecting a change in the attention state of the subject, the presentation of the content is modified based on the trajectory of the one or more eye positions so as to present different content than if the attention state of the subject had remained the not attending state.

20 Claims, 17 Drawing Sheets

Related U.S. Application Data

(60) Provisional application No. 61/898,430, filed on Oct. 31, 2013.

(58) Field of Classification Search
USPC .......................................................... 345/156
See application file for complete search history.

(56) References Cited

U.S. PATENT DOCUMENTS

| | | | |
|---|---|---|---|
| 4,838,681 | A | 6/1989 | Pavlidis |
| 4,885,687 | A | 12/1989 | Carey |
| 4,889,422 | A | 12/1989 | Pavlidis |
| 5,070,883 | A | 12/1991 | Kasahara |
| 5,137,027 | A | 8/1992 | Rosenfeld |
| 5,331,969 | A | 7/1994 | Silberstein |
| 5,491,492 | A | 2/1996 | Knapp et al. |
| 5,529,498 | A | 6/1996 | Cassily et al. |
| 5,649,061 | A | 7/1997 | Smyth |
| 5,662,117 | A | 9/1997 | Bittman |
| 5,743,744 | A | 4/1998 | Cassily et al. |
| 5,867,587 | A | 2/1999 | Aboutalib et al. |
| 5,942,954 | A | 8/1999 | Galiana et al. |
| 6,090,051 | A | 7/2000 | Marshall |
| 6,102,870 | A | 8/2000 | Edwards |
| 6,162,186 | A | 12/2000 | Scinto et al. |
| 6,231,187 | B1 | 5/2001 | Munoz et al. |
| 6,542,081 | B2 | 4/2003 | Torch |
| 6,575,902 | B1 | 6/2003 | Burton |
| 6,603,491 | B2 | 8/2003 | Lemelson et al. |
| 7,384,399 | B2 | 6/2008 | Ghajar |
| 7,390,091 | B2 | 6/2008 | Clemons et al. |
| 7,819,818 | B2 | 10/2010 | Ghajar |
| 8,866,809 | B2 | 10/2014 | McCarthy |
| 9,072,481 | B2 | 7/2015 | Shelhamer |
| 9,078,598 | B2 | 7/2015 | French et al. |
| 2002/0099305 | A1 | 7/2002 | Fukishima |
| 2003/0225342 | A1 | 12/2003 | Hong et al. |
| 2005/0177065 | A1 | 8/2005 | Ghajar |
| 2006/0270945 | A1 | 11/2006 | Ghajar |
| 2007/0017534 | A1 | 1/2007 | Thorpe |
| 2007/0236663 | A1 | 10/2007 | Waldorf et al. |
| 2009/0115965 | A1* | 5/2009 | Waldorf .................. A61B 3/113 351/210 |
| 2010/0094161 | A1 | 4/2010 | Kiderman et al. |
| 2010/0167246 | A1 | 7/2010 | Ghajar |
| 2010/0280372 | A1 | 11/2010 | Poolman |
| 2010/0292545 | A1 | 11/2010 | Berka |
| 2013/0230252 | A1 | 9/2013 | Hung |
| 2013/0230253 | A1 | 9/2013 | Stankiewicz |
| 2013/0233097 | A1 | 9/2013 | Hayner et al. |
| 2013/0300654 | A1* | 11/2013 | Seki .................. G06F 3/013 345/156 |
| 2014/0255888 | A1 | 9/2014 | Stack |
| 2014/0313488 | A1 | 10/2014 | Kiderman et al. |
| 2014/0327880 | A1 | 11/2014 | Kiderman et al. |
| 2014/0330159 | A1 | 11/2014 | Costa et al. |
| 2015/0051508 | A1 | 2/2015 | Ghajar et al. |
| 2015/0062534 | A1 | 3/2015 | Massengill |
| 2015/0077543 | A1 | 3/2015 | Kerr |
| 2015/0097826 | A1 | 4/2015 | McCarthy |
| 2015/0141865 | A1* | 5/2015 | Nakajima ............. A61B 5/0075 600/558 |
| 2015/0277710 | A1 | 10/2015 | Lee et al. |
| 2016/0022137 | A1 | 1/2016 | Wetzel et al. |
| 2016/0106315 | A1* | 4/2016 | Kempinski ............. A61B 3/113 351/210 |
| 2016/0132726 | A1* | 5/2016 | Kempinski ......... G06K 9/00617 382/117 |
| 2016/0299505 | A1* | 10/2016 | Ohara .................. B25J 11/0005 |
| 2016/0371726 | A1* | 12/2016 | Yamaji ............... G06Q 30/0246 |
| 2016/0379261 | A1* | 12/2016 | Avalos ............... G06Q 30/0261 705/14.58 |
| 2017/0123492 | A1* | 5/2017 | Marggraff ............. G06F 3/0236 |
| 2018/0115673 | A1* | 4/2018 | Yamasaki ........... H04N 1/00896 |
| 2018/0133504 | A1* | 5/2018 | Malchano ................ A61B 5/16 |
| 2018/0196511 | A1* | 7/2018 | Chae ........................ G06F 3/013 |
| 2018/0210546 | A1* | 7/2018 | Rawlinson ......... G06K 9/00604 |

OTHER PUBLICATIONS

Barnes, "Anticipatory Control of Hand and Eye Movements in Humans During Oculo-Manual Tracking," Journal of Physiology (2002), 539.1, The Physiological Society 2002, 14 pgs.
Chan, "Are There Sub-Types of Attentional Deficits in Patients with Persisting Post-Concussive Symptoms? A Cluster Analytical Study," Brain Injury, 2003, vol. 17, No. 2, 18 pgs.
Cronin-Golomb, et al., "Visual dysfunction in Alzheimer's disease: relation to normal aging," Annals of neurology 29.1 (1991): 41-52.
EPO Office Action, App. No. 06813639.9, May 31, 2011, 11 pgs.
"Eye Tracking," downloaded from http://en.wikipedia.org/wiki/eye_tracking, on Jun. 27, 2008, 5 pgs.
Gibbon, "Toward a Neurobiology of Temporal Cognition: Advances and Challenges, Current Opinion in Neurobiology," (1997) 7:170-184, 16 pgs.
Glenstrup et al., "2 Present-day Eye-Gaze Tracking Techniques," downloaded from http://www.diku.dk/~panic/eyegaze/node8.html on Jun. 27, 2008, 3 pgs.
Gredeback, "The Development of Two-Dimensional Tracking: A Longitudinal Study of Circular Pursuit," Exp. Brain Res. (2005) 163:204-213, 10 pgs.
Green, "Deficits in Facial Emotion Perception in Adults with Recent Traumatic Brain Injury," Neuropsychologia, (2004) 42:133-141, 9 pgs.
Hulsmann, "From Will to Action: Sequential Cerebellar Contributions to Voluntary Movement," NeuroImage, (2003) 20:1485-1492, 18 pgs.
ISR, PCT/US2006/032773, Jan. 22, 2007.
"Jonny Chung Lee>Projects>Wii," downloaded from http://www.cs.cmu.edu/~johnny/projects/wii/ on Jun. 28, 2008, 2 pgs.
Jonny Chung Lee, "Procrastineering giving into productive distractions," downloaded from http://procrastineering.blogspot.com/2007/12/wiimote.desktopvr~faq.., 4 pgs.
Kathmann, "Deficits in Gain of Smooth Pursuit Eye Movements in Schizophrenia and Affective Disorder Patients and Their Unaffected Relatives," Am J. Psychiatry 160:4, Apr. 2003, 8 pgs.
Kim et al., "Vision-Based Eye-Gaze Tracking for Human Computer Interface," 0-7803-5731-0/99, 1999 IEEE, pp. 324-329.
Kumar, Manu, "Gaze-enhanced User Interface Design," downloaded from http://hci.stanford.edu.reasearch/GUIDe/on Jun. 27, 2008, 2 pgs.
Lane, D.M., "Measures of Variability," Online Stat Book, Internet Archive, Dec. 27, 2012, retrieved from <http://web-beta.archive.org/web/20121227105126/http://onlinestatbook.com/2/summarizing_distributions/variability.html> on Mar. 28, 2017, 4 pgs.
Lewine, "Neuromagnetic Assessment of Pathophysiologic Brain Activity Induced by Minor Head Trauma," AJNR Am. J. Neuroradiol., (May 1999) 20:857-866, 10 pgs.
Lutz, "Guiding the Study of Brain Dynamics by Using First-Person Data: Synchrony Patterns Correlate with Ongoing Conscious States During a Simple Visual Task," PNAS, (Feb. 5, 2002) 99(3):1586-1591, 6 pgs.
Madelain, "Effects of Learning on Smooth Pursuit During Transient Disappearance of a Visual Target," J. Neurophysiol., (2003) 90:972-982, 11 pgs.
Mangels, "Effects of Divided Attention on Episodic Memory in Chronic Traumatic Brain Injury: A Function of Severity and Strategy," Neuropsychologia, (2002) 40:2369-2385, 17 pgs.
Mehta, "Forward Models in Visuomotor Control," J. Neurophysiol., (2002) 88:942-953, 12 pgs.
Pedersen, "Origin of Human Motor Readiness Field Linked to Left Middle Frontal Gyrus by MEG and PET," NeuroImage 8, 214-220 (1998) Article No. NI980362, 7 pgs.
Perbal, "Relationships Between Time Estimation, Memory, Attention, and Processing Speed in Patients with Severe Traumatic Brain Injury," Neuropsychologia, (2003) 41:1599-1610, 13 pgs.

(56) References Cited

OTHER PUBLICATIONS

Smith, "A Right Hemispheric Frontocerebellar Network for Time Discrimination of Several Hundreds of Milliseconds," NeuroImage, (2003) 20:344-350, 7 pgs.
Strauss, "Intraindividual Variability in Cognitive Performance in Three Groups of Older Adults: Cross-Domain Links to Physical Status and Self-Perceived Affect and Beliefs," Journal of the International Neuropsychological Society (2002), 8, 893-906, 14 pgs.
Sync-Think, Inc., International Search Report and Written Opinion, PCT/US2014/050774, dated Nov. 12, 2014, 13 pgs.
Sync-Think, Inc., International Preliminary Report on Patentability, PCT/US2014/050774, dated Feb. 16, 2016, 9 pgs.
Sync-Think, Inc., International Search Report, PCT/US2016/027923, dated Jul. 7, 2016, 13 pgs.
Sync-Think, Inc., International Preliminary Report on Patentability, PCT/US2016/027923, dated Oct. 17, 2017, 9 pgs.
Sync-Think, Inc., Communication Pursuant to Rules 161(1) and 162, EP14755513.0, dated Mar. 23, 2016, 2 pgs.
Sync-Think, Inc., Communication Pursuant to Article 94(3), EP14755513.0, dated Dec. 21, 2017, 8 pgs.
Sync-Think, Inc., Communication Pursuant to Article 94(3), EP14755513.0, dated Mar. 1, 2017, 5 pgs.
"The Exploratorium: seeing/seeing in context," downloaded from http://www.exploratorium.edu/seeing/about/seeing_attention.html on Jun. 28, 2008, 2 pgs.
Ross et al., "Anticipatory saccades during smooth pursuit eye movements and familial transmission of schizophrenia." Biological Psychiatry 44.8 (1998): 690-697.
Squeri, Valentina et al., "Force-field compensation in a manual tracking task," PLoS One Jun. 2010, vol. 5, No. 6, e11189, 12 pgs.

\* cited by examiner

SYSTEM AND METHOD FOR DYNAMIC CONTENT DELIVERY BASED ON GAZE ANALYTICS

RELATED APPLICATIONS

This application is a continuation of U.S. patent application Ser. No. 14/530,598, filed Oct. 31, 2014, entitled "System and Method for Dynamic Content Delivery based on Gaze Analytics," which in turn claims priority to U.S. Provisional Patent Application No. 61/898,430, filed Oct. 31, 2013, each of which is hereby incorporated by reference in its entirety.

TECHNICAL FIELD

The disclosed embodiments relate generally to systems and methods of delivering content, such as multimedia content. More specifically, the disclosed embodiments relate to methods and systems for dynamic content delivery based on eye tracking (e.g., gaze) analytics.

BACKGROUND

Techniques to monitor and/or track a person's eye movements (for example, to detect a locus of the person's gaze) have been used in a variety of contexts. However, as described in more detail below, determining a locus of a person's gaze, however, does not provide insight into the quality of that person's level of attention, and therefore decisions based solely on the locus of a person's gaze may result in unsatisfactory man-machine interactions.

SUMMARY

Accordingly, there is a need for devices that are able to determine a user's level of attention and interact with the user by providing content dynamically in accordance with the user's level of attention. In accordance with some embodiments, a method, system, and computer-readable storage medium are proposed for dynamic content delivery based on gaze (e.g., eye tracking) analytics. For example, in some embodiments, content is dynamically provided in accordance with the user's level of attention.

BRIEF DESCRIPTION OF THE DRAWINGS

Like reference numerals refer to corresponding parts throughout the drawings.

DETAILED DESCRIPTION OF EMBODIMENTS

Figure 1:
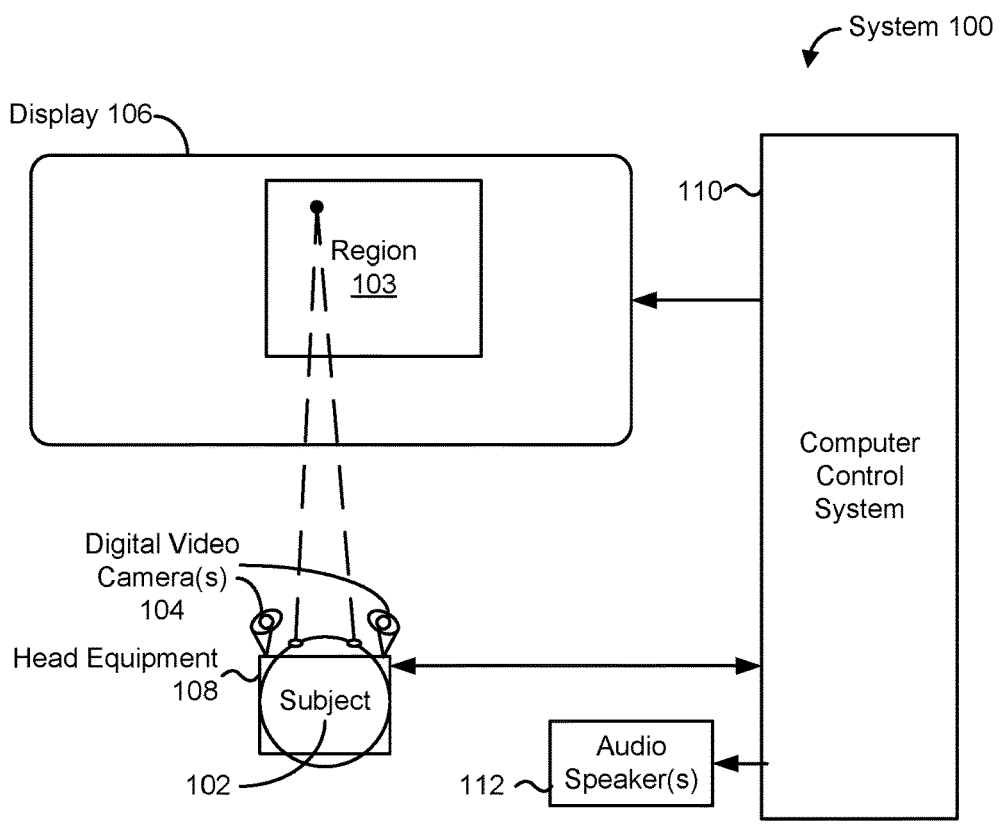
FIG. 1 illustrates a system for delivering content based on gaze analytics, in accordance with some embodiments.

A portable electronic device such as a smart phone may track a user's eye movements in order to determine whether the user is looking at the screen. When the device detects that the user is not looking at the screen, the device may, for example, automatically pause video content that is being displayed on the device. However, determining a locus of a person's gaze, does not provide insight into the quality of that person's level of attention. Indeed, a device may be "tricked" into continuing to provide video content simply because the user's eyes are directed towards the screen, despite the fact that the user is, for example, thinking about other things, or focused on aural stimuli (e.g., another person talking) and is therefore not attending to the visual content displayed on the screen. As taught and described in more detail below, a determination of a user's level of attention, in addition to the direction of their gaze, can be used to improve dynamic content delivery. Such information would improve user experience via a deeper level of user interface interaction with their device, and would allow, for example, better targeted advertising campaigns, as well as new models for advertisement billing.

Described in more detail below are devices that determine a user's level of attention and interact with the user by providing content dynamically in accordance with the user's level of attention. To this end, in accordance with some implementations, a method of presenting content to a subject based on eye position measurements is provided. The method includes presenting the subject with content. While presenting the content to the subject, one or more of the subject's eye positions is measured. The method further includes continuously performing the operations of generating a variability metric using the one or more measured eye positions and comparing the variability metric with a predetermined baseline to determine an attention state of the subject. Upon detection of a change in the attention state, the presentation of the content is modified.

In another aspect of the present disclosure, some implementations provide a method of generating a cost-per-action metric for advertising. The method includes presenting a subject with an advertisement. While presenting the advertisement to the subject, one or more of the subject's eye positions is measured. The method further includes generating a variability metric using the one or more measured eye positions and comparing the variability metric with a predetermined baseline to determine an attention state of the subject. The cost-per-action metric is generated in accordance with the attention state of the subject.

In yet another aspect of the present disclosure, some implementations provide a method of presenting content to a subject based on eye position measurements. The method includes presenting the subject with first content. While presenting the first content to the subject, one or more of the subject's eye positions is measured. The method further includes continuously generating a variability metric using the one or more measured eye positions and comparing the variability metric with a predetermined baseline to determine an attention state of the subject. The method further includes detecting a change in the attention state of the subject. In accordance with the detected change in the attention state of the subject, the subject is presented with second content.

In another aspect of the present invention, to address the aforementioned limitations of conventional eye tracking techniques, some implementations provide a non-transitory computer readable storage medium storing one or more programs. The one or more programs comprise instructions, which when executed by an electronic device with one or more processors and memory, cause the electronic device to perform any of the methods provided herein.

In yet another aspect of the present invention, to address the aforementioned limitations of conventional eye tracking techniques, some implementations provide an electronic device. The electronic device includes one or more processors, memory, and one or more programs. The one or more programs are stored in memory and configured to be executed by the one or more processors. The one or more programs include an operating system and instructions that when executed by the one or more processors cause the electronic device to perform any of the methods provided herein.

In accordance with some embodiments, a method, system, and computer-readable storage medium are provided for dynamic content delivery based on gaze analytics (e.g., analytics performed based on eye tracking measurements). Rather than delivering content based solely on a locus of a subject's gaze, the system, method, and computer-readable storage medium in these embodiments calculate a variability metric based on one or more eye position measurements. The variability metric is used to determine the extent to which the subject is attending, for example, by using a numerical value of the variability metric or comparing the numerical value with a baseline value in order to categorize the subject's attention level. For example, in some embodiments, the numerical value of the variability metric is compared to a baseline value associated with a demographic to which the subject belongs (such as an age group of the subject). Alternatively, the numerical value of the variability metric is compared to a baseline value obtained through one or more previous tests of the subject (sometimes called a personal baseline, or personal baseline variability metric). In some implementations, an attention state of the subject is categorized based on the comparison, for example, to determine that the subject's attention state is an attending state (e.g., the subject is paying attention), a not-attending state (e.g., the subject is not paying attention), or an about-to-attend state (e.g., the subject is trending towards paying attention). In some implementations, content is then delivered in accordance with the attention state. For example, the content is delivered statically when the subject is not attending, and the content is delivered at a predefined rate (e.g., a constant rate, or a rate proportional to the numerical value of the variability metric) when the subject is attending.

In accordance with some embodiments, a disconjugacy metric is described herein which can be used as the variability metric.

In some implementations, content is delivered further in accordance additional determinations, such as a locus of the subject's attention (e.g., a locus of the subject's gaze). Consider an example of a pre-recorded lecture delivered on a personal computing device (e.g., a tablet, smart-phone, laptop computer, personal computer, smart-television, or the like). The lecture may be a multimedia lecture that includes various types of content such as video content that is displayed on a region of a display and audio content that is produced by an audio speaker. In some implementations, the device will pause the lecture if the subject is not paying attention to the content (e.g., the attention state is the not-attending state or the locus of attention does not correspond to the region of the display). In some implementations, when the subject is paying attention to the content (e.g., the attention state is the attending state and the locus of attention is the region of display) the device will speed up or slow down delivery of the lecture based on the numerical value of the attending metric.

Reference will now be made in detail to various implementations, examples of which are illustrated in the accompanying drawings. In the following detailed description, numerous specific details are set forth in order to provide a thorough understanding of the present disclosure and the described implementations herein. However, implementations described herein may be practiced without these specific details. In other instances, well-known methods, procedures, components, and mechanical apparatus have not been described in detail so as not to unnecessarily obscure aspects of the implementations.

FIG. 1 illustrates a system 100 for delivering content based on gaze analytics, in accordance with some embodiments. In this example, the content is delivered on a display 106 of an electronic device (e.g., a tablet, smart-phone, laptop computer, personal computer, smart-television, or the like). The content includes visually displayed content (e.g., video) displayed in a region 103 of display 106. One or more digital video cameras 104 are focused on subject 102's eyes so that eye positions (and, in some embodiments, eye movements) of subject 102 are recorded. In accordance with some embodiments, digital video cameras 104 are mounted on subject 102's head by head equipment 108 (e.g., a headband, or a pair of eyeglasses). Various mechanisms are, optionally, used to stabilize subject 102's head, for instance to keep the distance between subject 102 and display 106 fixed, and to also keep the orientation of subject 102's head fixed as well. In one embodiment, the distance between subject 102 and display 106 is kept fixed at approximately 40 cm. In some implementations, head equipment 108 includes the head equipment and apparatuses described in U.S. Patent Publication 2010/0204628 A1, which is incorporated by reference in its entirety.

In some embodiments, the one or more digital video cameras 104 are incorporated into the electronic device. For example, in some embodiments, the device is a tablet computer that includes display 106 and digital video cameras 104 incorporated into a single housing of the device. In some implementations, digital video cameras 104 are also used for other device tasks, such as recording multimedia message service (MMS) messages, taking photographs to send to friends and family, etc.

Display 106 is, optionally, a computer monitor, projector screen, or other display device. Display 106 and digital video cameras 104 are coupled to computer control system 110. In some embodiments, computer control system 110 controls the patterns displayed and also receives and analyzes the eye position information received from the digital video cameras 104. In some implementations, computer control system 110 is optionally coupled with, and controls, one or more audio speakers 112. The one or more audio speakers 112, together with the computer control system 110, enable the system 100 to deliver audio content in accordance with gaze analytics.

Figure 2:
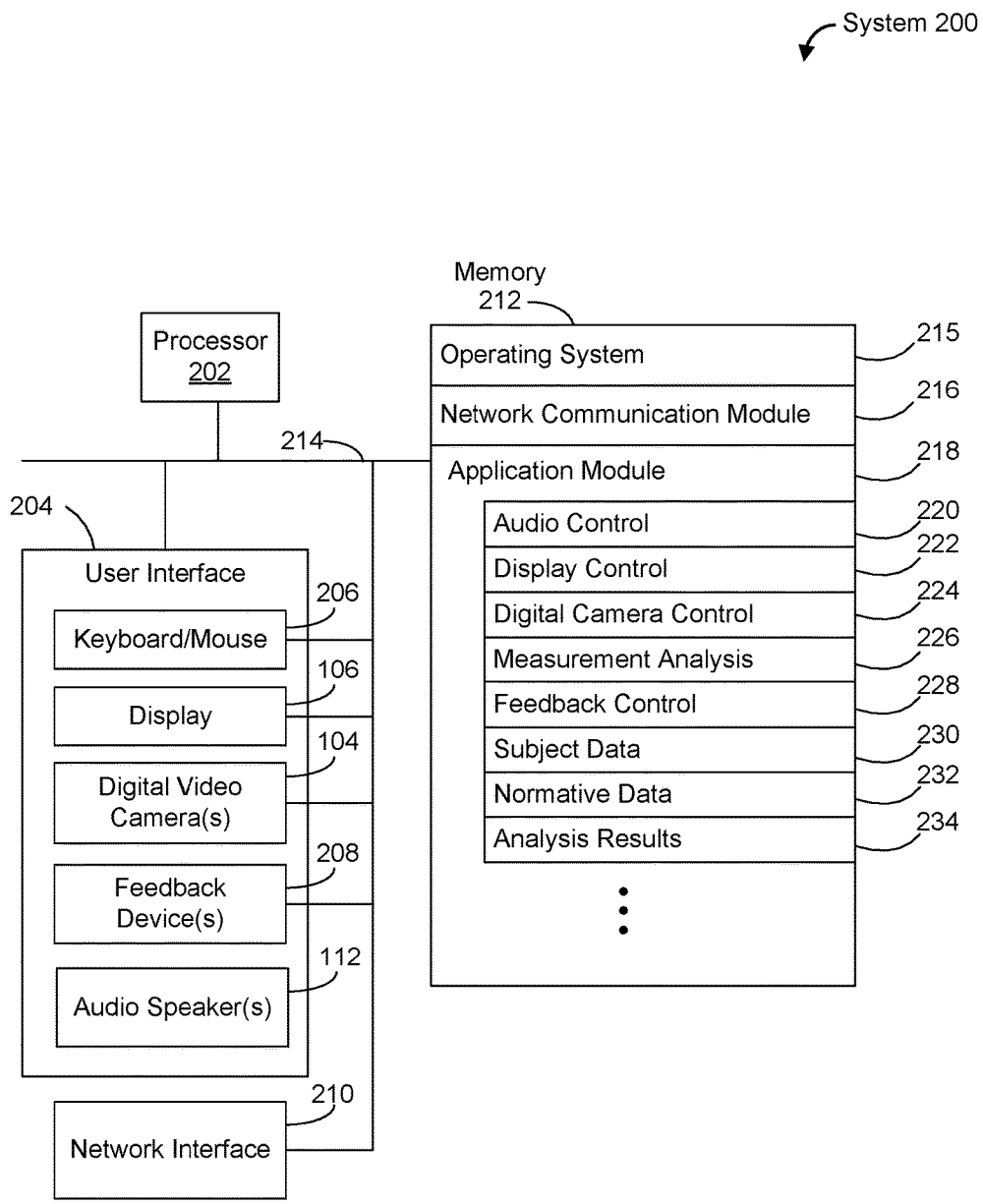
FIG. 2 is a block diagram illustrating a system for dynamic content delivery, in accordance with some embodiments.

FIG. 2 is a block diagram of a system 200 for delivering content based on gaze analytics, in accordance with some embodiments. In some embodiments, system 200 shares one or more components with system 100 described with reference to FIG. 1 (e.g., digital video camera(s) 104, display 106, and audio speaker(s) 112). While certain specific features are illustrated, those skilled in the art will appreciate from the present disclosure that various other features have not been illustrated for the sake of brevity and so as not to obscure more pertinent aspects of the implementations disclosed herein.

To that end, the system includes one or more processor(s) 202 (e.g., CPUs), user interface 204, memory 212, and one or more communication buses 214 for interconnecting these components. In some embodiments, the system includes one or more network or other communications interfaces 210, such as a network interface for conveying requests for content or receiving content from a content server (e.g., a web server) and/or a content delivery network. The user interface 204 includes one or more digital video cameras 106, and, in some embodiments, also includes display 106, a keyboard/mouse 206, and one or more feedback devices 208. In some implementations, display 106 is a touch-screen display, obviating the need for a keyboard/mouse 206.

The communication buses 214 may include circuitry (sometimes called a chipset) that interconnects and controls communications between system components. Memory 212 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the processor(s) 202. Memory 212, including the non-volatile and volatile memory device(s) within memory 212, comprises a non-transitory computer readable storage medium.

In some implementations, memory 212 or the non-transitory computer readable storage medium of memory 212 stores the following programs, modules and data structures, or a subset thereof, including an operating system 215, a network communication module 216, and an application module 218.

The operating system 215 includes procedures for handling various basic system services and for performing hardware dependent tasks.

The network communication module 216 facilitates communication with other devices via the one or more communication network interfaces 210 (wired or wireless) and one or more communication networks, such as the Internet, other wide area networks, local area networks, metropolitan area networks, and so on.

In some embodiments, application module 218 includes audio control module 220, display control module 222, digital camera control module 224, measurement analysis module 226, and, optionally, feedback module 228. Audio control module 220 controls audio speaker(s) 112 in order to deliver audio content. Display control module 222 controls display 106 in order to provided displayed content, such as video content. Digital camera control module 224 receives signals from digital video camera(s) 104 and, where appropriate, analyzes raw data in the digital video camera signals so as to extract values indicative of one or more of the subject's (e.g., subject 102 in FIG. 1) eye-positions. The analysis optionally includes facial feature recognition analysis that distinguishes between the subject's eyes and, for example, the subject's nose. Digital camera control module 224 also sends control signals to digital video camera(s) 104, for example, to re-focus digital video camera(s) 104 on the subject's eye-position. Measurement analysis module 226 analyzes the sensor signals to produce measurements and analyses, as discussed elsewhere in this document. Feedback module 228, if included, generates feedback signals for presentation to the subject via display 104 or feedback devices 208. For example, display 104 may optionally present an indication of an attention state of the subject, such as an "attention meter" displayed on the display or a "traffic light" with red, yellow, and green lights, where red indicates that the subject is not attending, yellow indicates that the subject is barely attending, and green indicates that the subject is attending. As another example, feedback device 208 can optionally include a tactile output device controlled by feedback control module 228 which, for example, produces a vibration on the subject's finger when the subject's attention starts to drift (e.g., when the user's attention state changes from the attending state to the not-attending state).

In some embodiments, application module 218 also stores subject data 230, which includes measurement data for a subject, analysis results 234 and the like. Subject measurement data can be used to generate a personal baseline against which a variability metric of the subject is compared (e.g., to determine an attention state of the subject). In some embodiments, application module 218 stores normative data 232, which includes measurement data from one or more control groups of subjects, and optionally includes analysis results 234, and the like, based on the measurement data from the one or more control groups. In some embodiment, this control group measurement data can be used to generate a baseline value against which a variability metric of the subject is compared (e.g., to determine an attention state of the subject). In some embodiments, the control groups include one or more control group subjects that match a demographic of the subject (e.g., an age range, gender, socio-economic status, etc.)

Still referring to FIG. 2, in some embodiments, digital video camera(s) 104 include one or more digital video cameras focused on the subject's pupil. In some embodiments, digital video camera(s) 104 operate at a picture update rate of at least 200 hertz. In some embodiments, the one or more digital video cameras are infrared cameras, while in other embodiments, the cameras operate in other portions of the electromagnetic spectrum. In some embodiments, the resulting video signal is analyzed by processor(s) 202, under the control of measurement analysis module 226, to determine the screen position(s) where the subject focused, and the timing of when the subject focused at one or more predefined screen positions.

In some embodiments, not shown, the system shown in FIG. 2 is divided into two systems, one which measures a subject and collects data, and another which receives the collected data, analyzes the data and delivers content in accordance with the collected and analyzed data (e.g., a server system).

Eye Position Calibration and Measurements.

In some embodiments, in order to provide accurate and meaningful real time measurements of where the user is looking at any one point in time, eye position measurements (e.g., produced via digital video cameras 104) are calibrated by having the subject focus on a number of points on a display (e.g., display 106) during a calibration phase or process. For instance, in some embodiments, the calibration is based on nine points displayed on the display, include a center point, positioned at the center of the display and eight points along the periphery of the display. In some embodiments, the eight points correspond to locations having angular positions at 45 degree increments with respect to the center. The subject is asked to focus on each of the calibration points, in sequence, while digital video cameras (e.g., digital video cameras 104) measure the pupil and/or eye position of the subject. Optionally, dynamic content is displayed at each point during the calibration to help ensure that the user focuses on that point. The resulting measurements are then used by a computer control system (e.g., computer control system 110) to produce a mapping of eye position to screen location, so that the system can determine the position of the display at which the user is looking at any point in time. In other embodiments, the number of points used for calibration may be more or less than nine points, and the positions of the calibration points may distributed on the display in various ways.

The resulting measurements can also be used to produce a personal baseline variability metric for future comparison. For example, future measurements can be used to generate a variability metric, and the variability metric can be compared to the personal baseline variability metric to determine an attention level of the subject.

In some implementations, a calibration process (e.g., a calibration process less extensive than an initial calibration process) is performed each time a subject utilizes a dynamic content delivery feature of the system, because small differences in head position relative to the cameras, and small differences in position relative to the display 106, can have a large impact on the measurements of eye position, which in turn can have a large impact on the "measurement" or determination of the display position at which the subject is looking. The calibration process can also be used to verify that the subject (e.g., subject 102) has a sufficient range of oculomotor movement to make use of the feature.

In some embodiments, the eye position measurements are used to determine eye movement reaction times and the variability metric is based on the eye movement reaction times. In some embodiments, the eye movement reaction times are measured by a digital video infrared camera (e.g., digital video camera 104) focused on the subject's pupil, operating at a picture update rate of at least 200 hertz. The resulting digital video signal is analyzed by a computer to determine the screen position(s) where the subject was focusing, and the timing of when the subject focused at the appropriate screen position.

In some embodiments, the calibration process is performed by asking the subject to follow a moving object for eight to twenty clockwise circular orbits. For example, in some embodiments, the subject is asked to follow the moving object for twelve clockwise circular orbits having a rate of movement of 0.4 Hz, measured in terms of revolutions per second. Furthermore, in some embodiments, the subject is asked to follow the moving object for two or three sets of eight to twenty clockwise circular orbits, with a rest period between. The angular amplitude of the moving object, as measured from the subject's eyes, is about 5 degrees in the horizontal and vertical directions. In other embodiments, the angular amplitude of the moving object is in the range of 3 to 10 degrees.

The eye positions of the subject can be divided into horizontal and vertical components for analysis. Thus, in some embodiments, four sets of measurements are made of the subject's eye positions: left eye horizontal position, left eye vertical position, right eye horizontal position, and right eye vertical position. In some embodiments, one or two sets of two dimensional measurements (based on the movement of one or two eyes of the subject) are used for analysis of the subject. In some embodiments, the sets of measurements are used to generate a variability metric. In some embodiments, the variability metric is a disconjugacy metric generated by using a binocular coordination analysis, as described in greater detail below.

In some embodiments, the video cameras (e.g., digital video cameras 104) take pictures of the subject's eye or eyes at least 400 times per second (i.e., the video cameras having a picture frame rate of at least 400 frames per second). For instance, in some embodiments, the video cameras take pictures of the subject's eye or eyes about 500 times per second, or about once every 2 milliseconds. In some embodiments, the variability metric is based on a data from a shifting window of time characterized by a duration of at least one second. Thus, the video cameras take at least 400 pictures of each eye, thereby providing a significant amount of data on which to base an update to the variability metric.

Furthermore, as discussed in more detail in published U.S. Patent Publication 2006/0270945 A1, and 2008/0206727 A1, which are incorporated by reference in their entirety, measurements of a subject's point of focus (sometimes referred to herein as a locus of attention) while attempting to smoothly pursue a moving displayed object can also be analyzed so as to provide one or more additional metrics, such as various tracking metrics, attention metrics, accuracy metrics, variability metrics, and so on.

Disconjugacy of Binocular Coordination.

Many people have one dominate eye (e.g., the right eye) and one subservient eye (e.g., the left eye). For these people, the subservient eye follows the dominate eye as the dominate eye tracks an object. In some embodiments, a disconjugacy metric is calculated to measure how much the subservient eye lags behind the dominate eye while the dominate eye is tracking an object. Impairment due to loss of attention, fatigue, distraction, sleep deprivation, aging, alcohol, drugs, hypoxia, infection, clinical neurological conditions (e.g., ADHD, schizophrenia, and autism), and/or brain trauma (e.g., head injury or concussion) can increase the lag (e.g., in position or time) or differential (e.g., in position or time) between dominate eye movements and subservient eye movements, and/or increase the variability of the lag or differential, and thereby increase the corresponding disconjugacy metric.

In some embodiments, the disconjugacy of binocular coordination is the difference between the left eye position and the right eye position at a given time, and is calculated as:

$$\text{Disconj}(t) = \text{POS}_{LE}(t) - \text{POS}_{RE} \qquad (t)$$

where "t" is the time and "$\text{POS}_{LE}(t)$" is the position of the subject's left eye at time t and "$\text{POS}_{RE}(t)$" is the position of the subject's right eye at time t. In various embodiments, the disconjugacy measurements include one or more of: the difference between the left eye position and the right eye position in the vertical direction (e.g., $\text{POS}_{RE_x}(t)$ and $\text{POS}_{LE_x}(t)$); the difference between the left eye position and the right eye position in the horizontal direction (e.g., $\text{POS}_{RE_y}(t)$ and $\text{POS}_{LE_y}(t)$); the difference between the left eye position and the right eye position in the two-dimensional horizontal-vertical plane (e.g., $\text{POS}_{RE_{xy}}(t)$ and $\text{POS}_{LE_{xy}}(t)$); and a combination of the aforementioned.

In some embodiments, a variability metric is based on disconjugacy during shifting window of time (e.g., 0.5 seconds, 1 second, 2 seconds, etc.). To quantify the disconjugacy during a respective window of time, the standard deviation of disconjugate eye positions (SDDisconj) during the respective window of time is calculated. In some embodiments, the variability metric is generated in accordance with the standard deviation of the disconjugate eye positions during the respective window of time. In accordance with some embodiments, SDDisconj for a set of "N" values is calculated as:

$$SDDisconj_N = \sqrt{\frac{1}{N}\sum_{i=1}^{N}(x_i - \langle x \rangle)^2}$$

where "x" is a disconjugate measurement discussed above (e.g., Disconj(t)) and "$\langle x \rangle$" represents the average value of the disconjugate eye positions. Thus, in various embodiments, $SDDisconj_N$ represents: the standard deviation of disconjugate eye positions in the vertical direction; the standard deviation of disconjugate eye positions in the horizontal direction; or the standard deviation of disconjugate eye positions in the two-dimensional horizontal-vertical plane. In some embodiments, a separate SDDisconj measurement is calculated for two or more of the vertical direction, the horizontal direction, and the two-dimensional horizontal-vertical plane.

Therefore, in various embodiments, disconjugacy measurements, standard deviation of disconjugacy measurements and one or more related measurements (e.g., a variability of eye position error measurement, a variability of eye velocity gain measurement, an eye position error measurement, and/or a rate or number of saccades measurement) are calculated. Furthermore, in various embodiments, the disconjugacy measurements, standard deviation of disconjugacy measurements, and related measurements are calculated for one or more of: the vertical direction; the horizontal direction; the two-dimensional horizontal-vertical plane; and a combination of the aforementioned.

In some embodiments, one or more of the above identified measurements are obtained for a subject and then compared with normative data (e.g., derived measurements for other individuals). In some embodiments, one or more of the above identified measurements are obtained for a subject and then compared with the derived measurements for the same subject at an earlier time. For example, changes in one or more derived measurements for a particular person are used to evaluate improvements or deterioration in the person's attention. Distraction, fatigue, or disinterest are often responsible for deterioration in the person's ability to pay attention to content that is provided to them. In some embodiments, decreased attention, caused by fatigue or a distractor, can be measured by comparing changes in one or more derived measurements for a particular person. In some embodiments, decreased attention can be measured by monitoring error and variability during smooth eye pursuit.

Figure 3A:
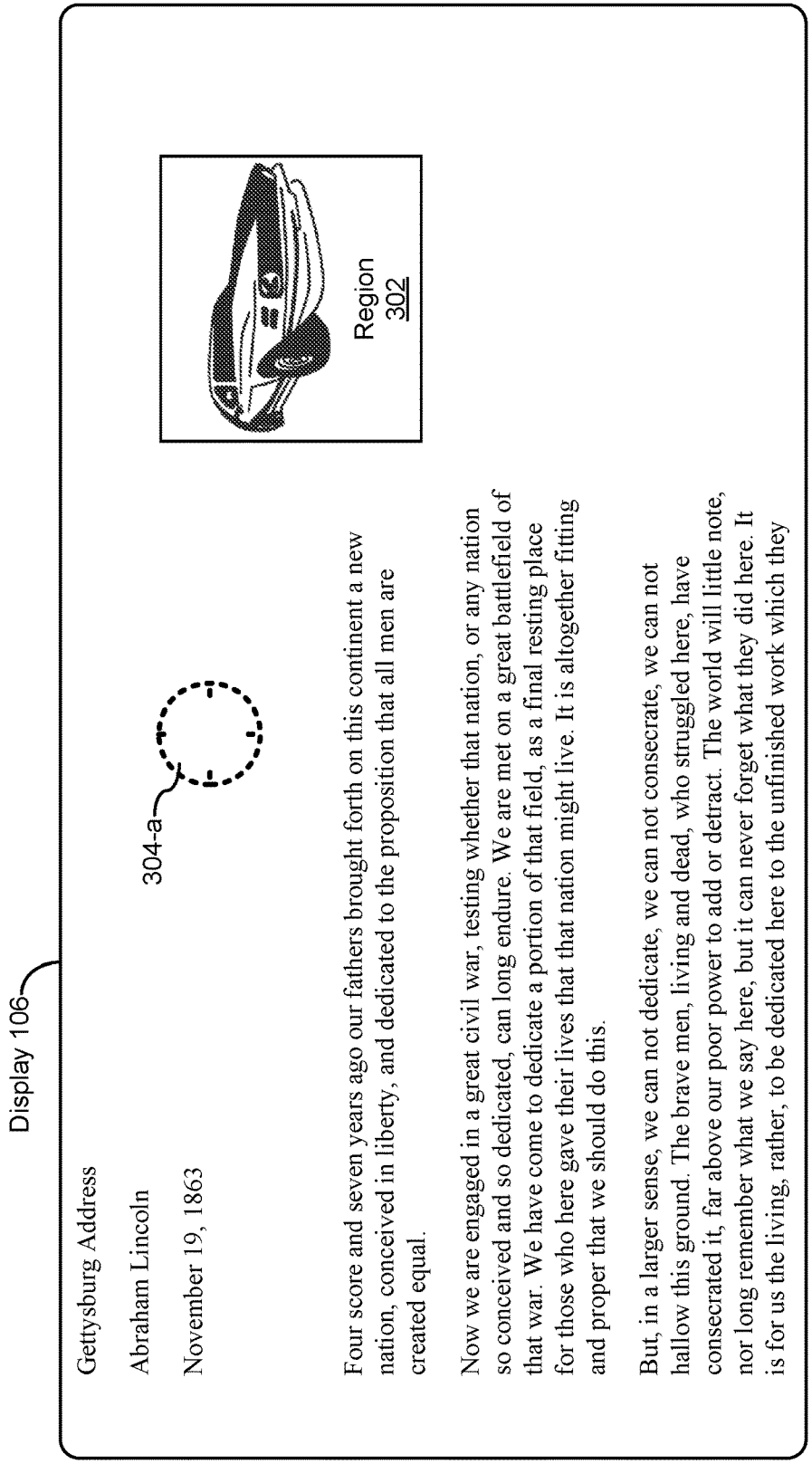
FIGS. 3A-3C illustrate an example of dynamic content delivery based on gaze analytics, in accordance with some embodiments.
Figure 3B:
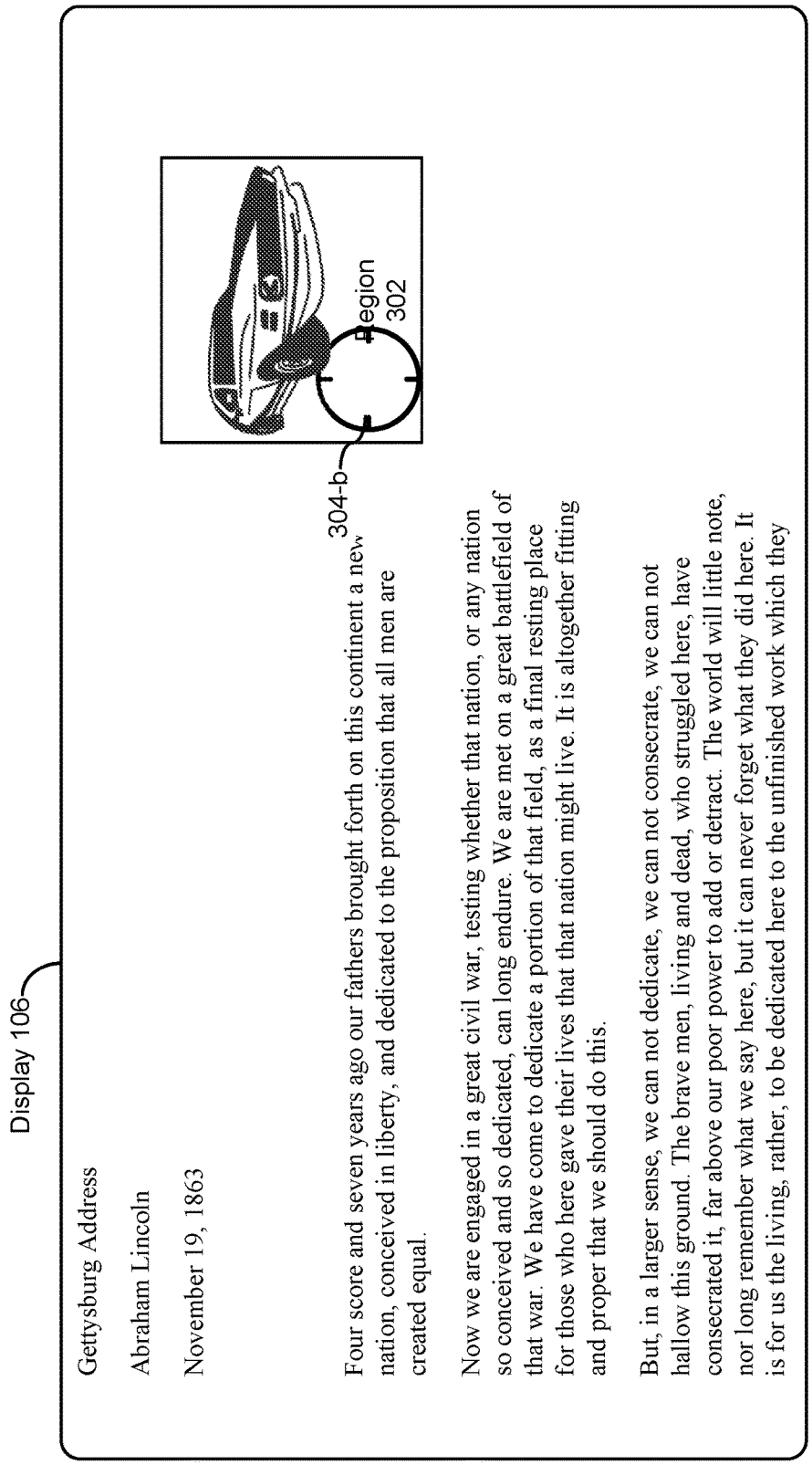
Figure 3C:
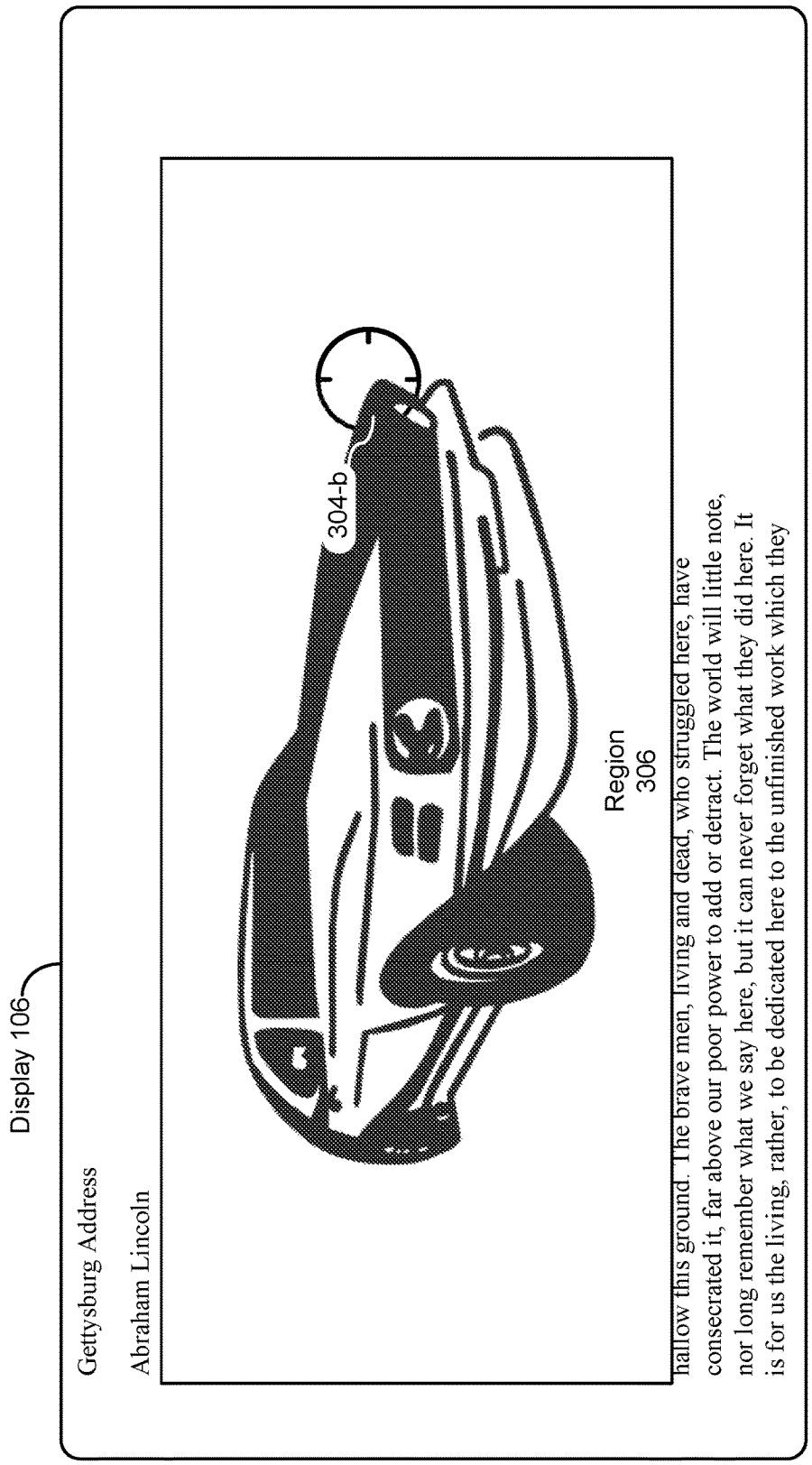

Examples and Methods of Dynamic Content Delivery. FIGS. 3A-3C illustrate an example of dynamic content delivery based on gaze analytics, in accordance with some embodiments. For ease of explanation, the example illustrated in FIGS. 3A-3C is described with reference to visually displayed content. It should be understood, however, that in some embodiments, the content may also include audio content, tactile content, or a combination thereof.

FIG. 3A illustrates visual content displayed on display 106. A portion of Lincoln's Gettysburg Address is displayed, for example, by a web browser. A car advertisement is displayed in a region 302 of the display. Also shown in FIG. 3A is an attention indicator 304 which indicates a locus of attention 304-a. The attention indicator 304 is not typically displayed on display 106 (although it can be), but is rather provided in FIGS. 3A-3C for ease of explanation of FIGS. 3A-3C. In this example, the dashed circle of attention indicator 304 in FIG. 3A indicates that the subject's attention state is a not-attending state. Determination of the subject's attention state is described below with reference to methods 500, 600, and 700. FIG. 3B illustrates that the subject's attention has shifted to a locus of attention 304-b, which is now over region 302. In addition, the solid circle of attention indicator 304 indicates that the subject's attention state is an attending state.

FIG. 3C illustrates modification of the advertisement in accordance with the system's determination that the locus of attention is the region 302 (FIG. 3B) and that the subject's attention state is the attending state. In particular, in this example the system modifies the advertisement by expanding the advertisement to a larger region 306. In additional, for example, the advertisement may transition to footage of the car being driven by a professional driver on a closed course. In addition, in some embodiments, a cost-per-action metric is generated following the modification. This provides a cost-basis for which the advertiser can be charged appropriately for the impact of their advertisement, as well as a manner in which to improve targeted advertising campaigns.

Figure 4A:
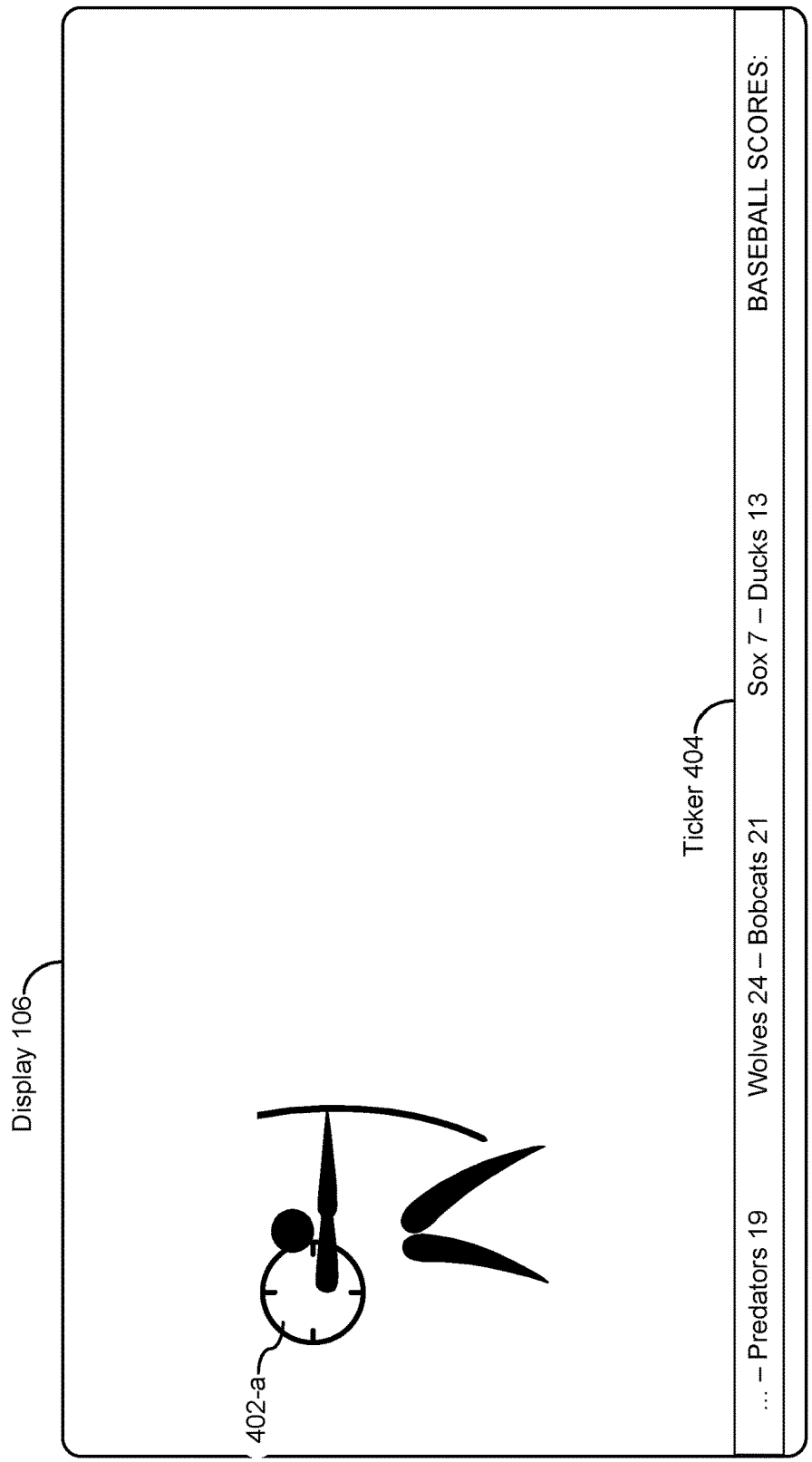
FIGS. 4A-4C illustrate another example of dynamic content delivery based on gaze analytics, in accordance with some embodiments.
Figure 4B:
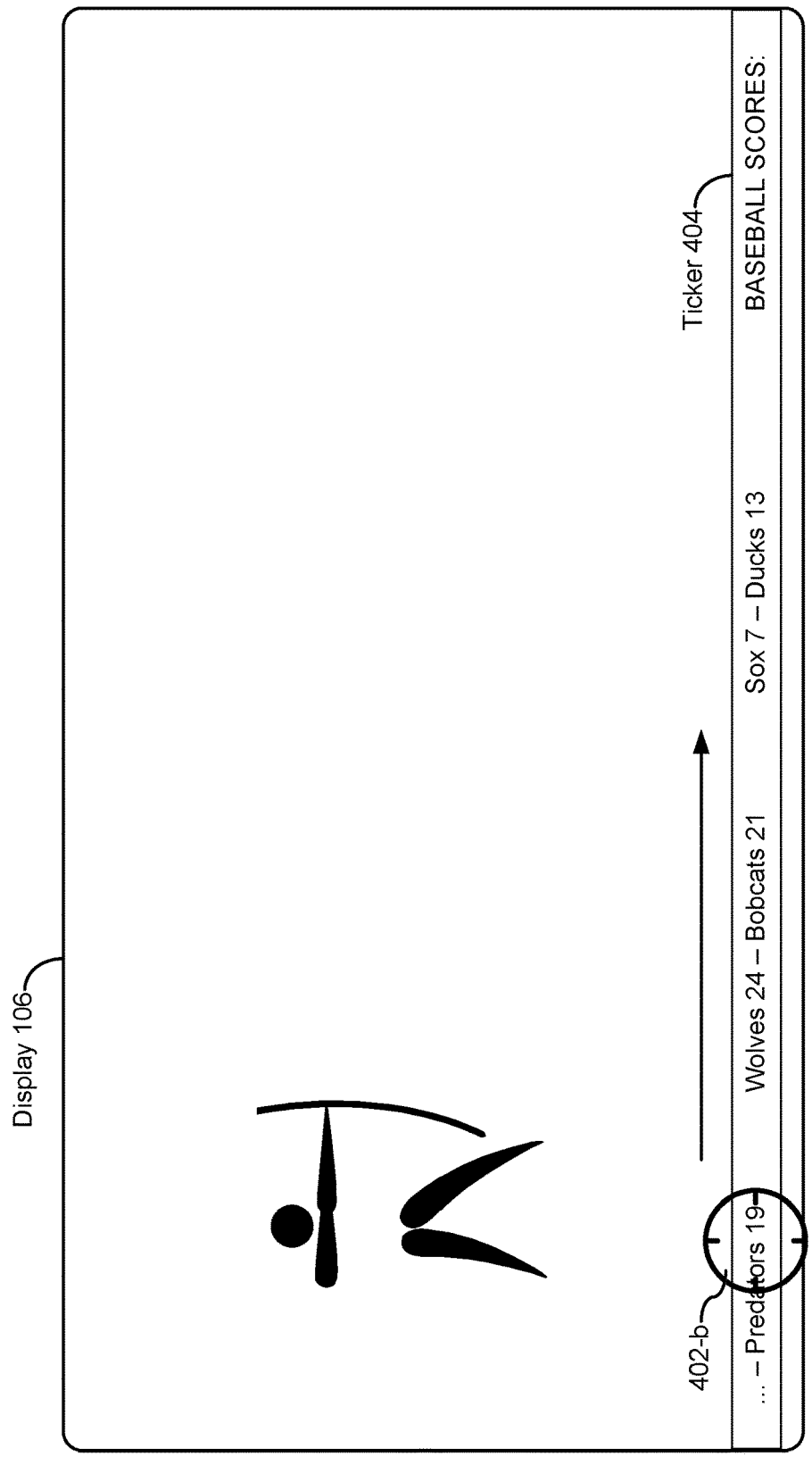
Figure 4C:
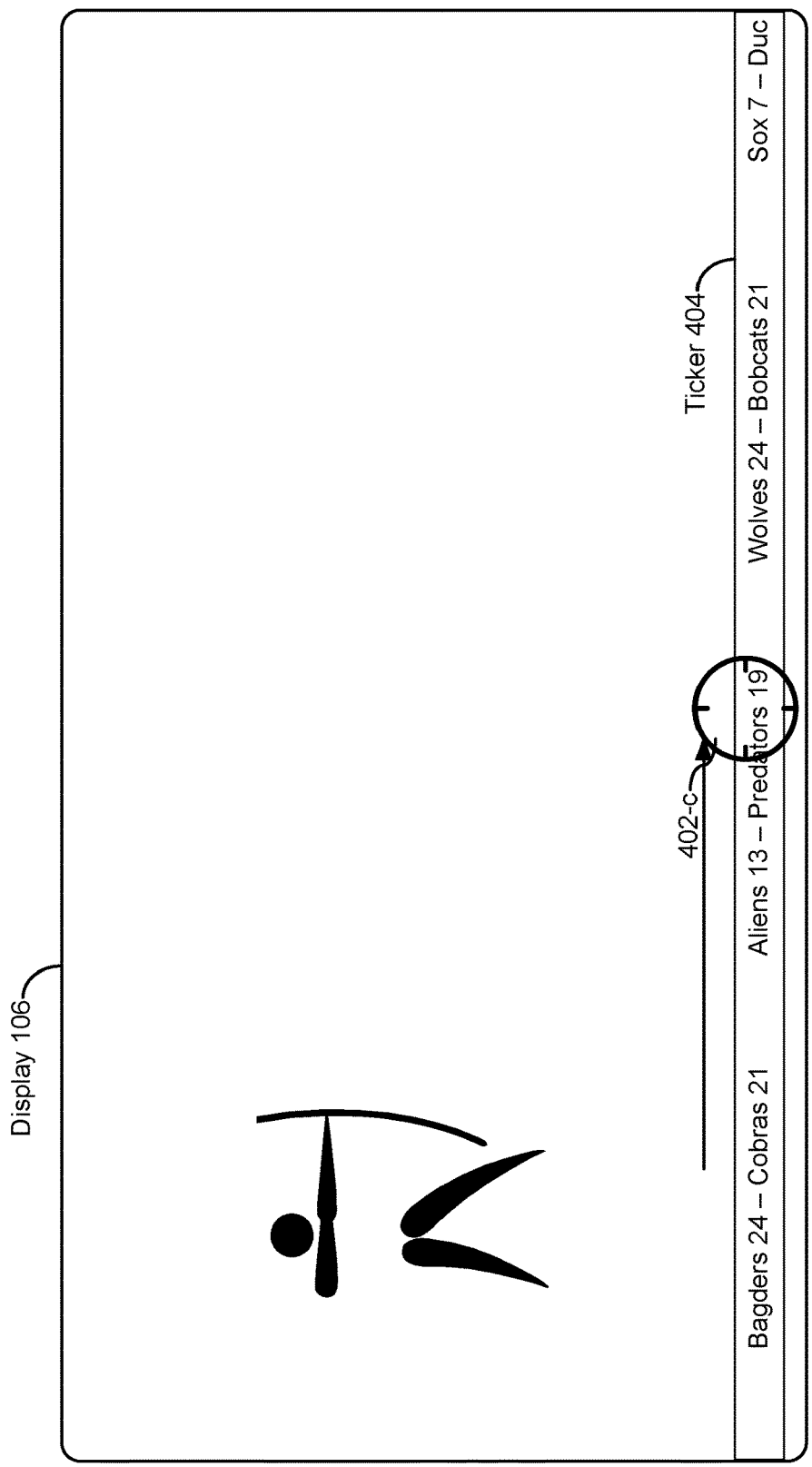
Figure 5A:
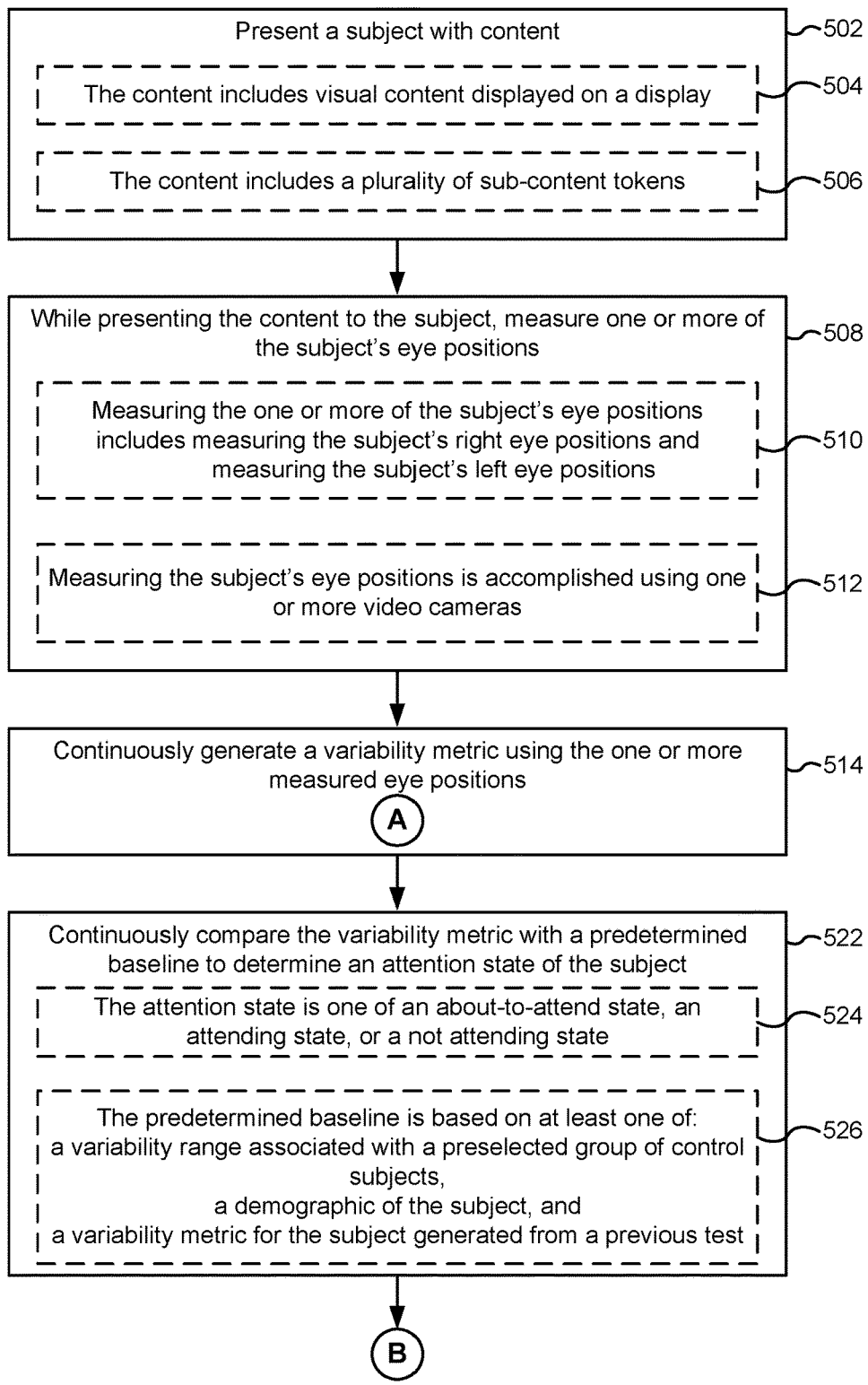
FIGS. 5A-5D illustrate a flow diagram of a method for delivering content dynamically based on gaze analytics, in accordance with some embodiments.
Figure 5B:
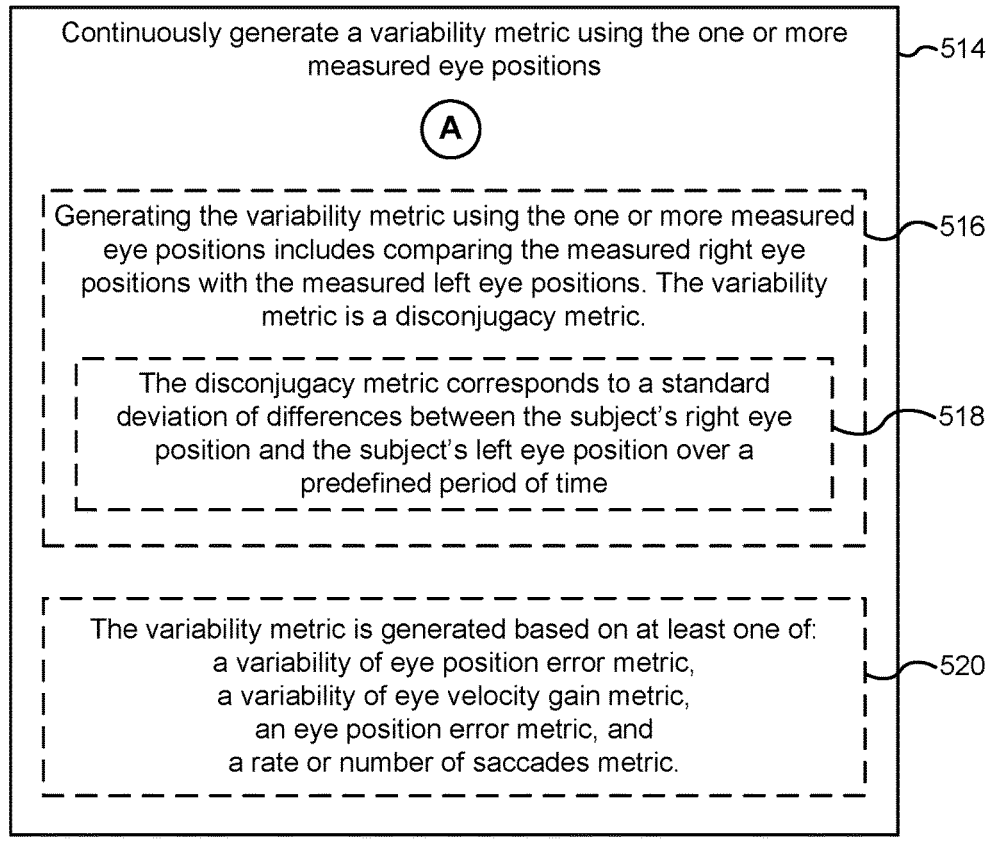
Figure 5B:
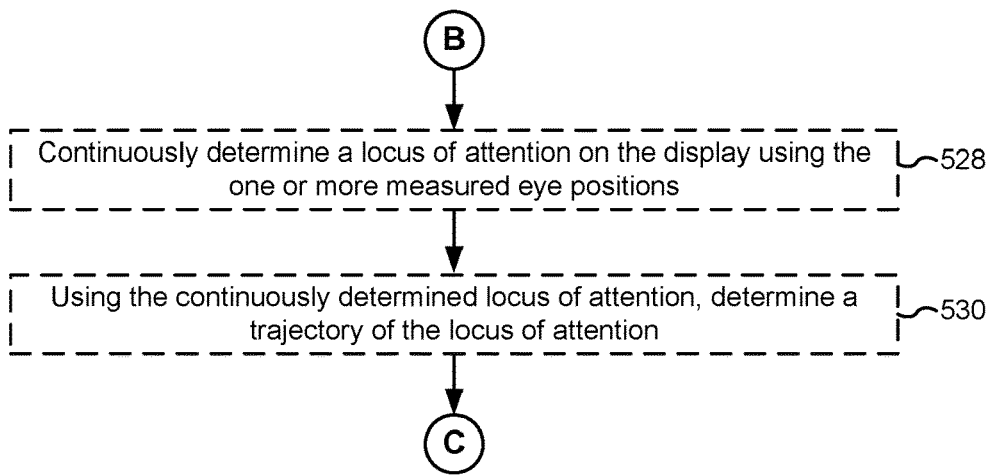
Figure 5C:
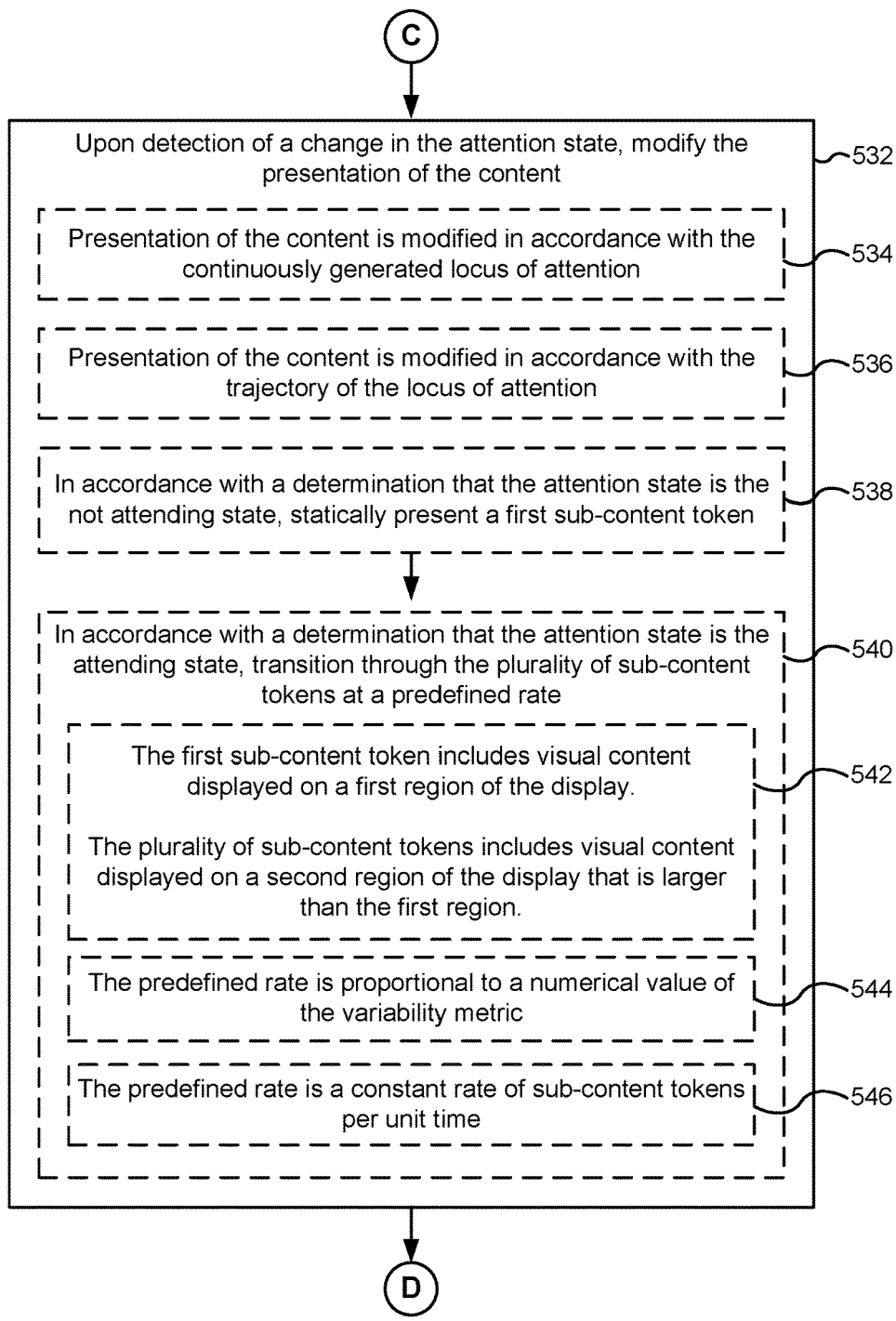
Figure 5D:
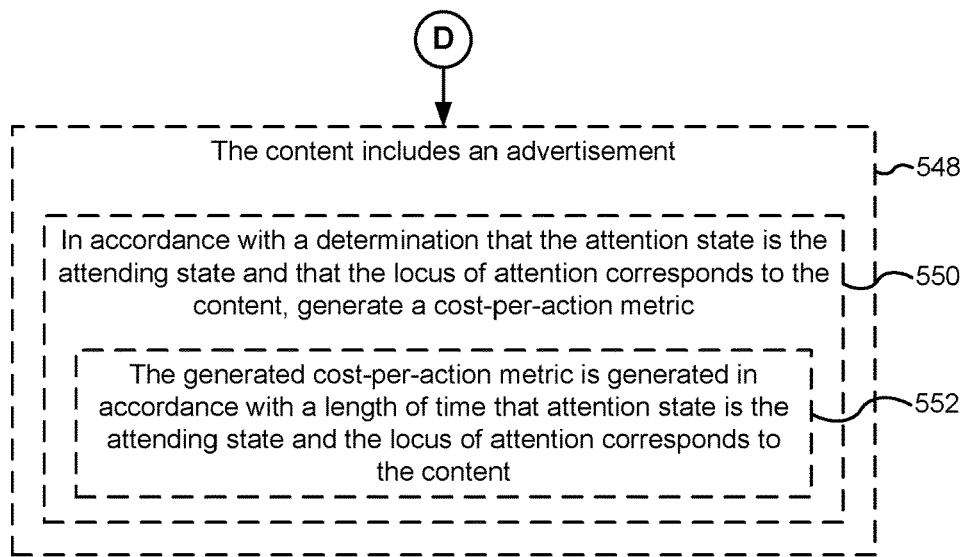

FIGS. 4A-4C illustrate another example of dynamic content delivery based on gaze analytics, in accordance with some embodiments. For ease of explanation, the example illustrated in FIGS. 4A-4C is described with reference to visually displayed content. It should be understood, however, that in some embodiments, the content may also include audio content, tactile content, or a combination thereof.

FIG. 4A illustrates visual content displayed on display 106. For the purposes of this example, display 106 is assumed to be a display of a smart-television. A sporting event (e.g., an archery event) is displayed as a live broadcast, for example, on the smart-television. Also shown in FIG. 4A is an attention indicator 402 which indicates a locus of attention 402-a. In addition, the solid circle of attention indicator 402 in FIGS. 4A-4C indicates that the subject's attention state is the attending state. A ticker 404 that provides scrolling scores from other sporting events is also displayed on display 106. In some circumstances, the ticker 404 alternatively displays new headlines, stock prices, elections results, etc.

FIG. 4B illustrates that the subject's attention has shifted to a locus of attention 402-b, which is now over ticker 404, and the subject's attention state is the attending state. In some embodiments, when the locus of attention 402-b is over the ticker 404 and the subject's attention state is the attending state, the ticker pauses, allowing the reader to read the content that is displayed. In addition, FIG. 4B illustrates movement of the locus of attention from 402-b to 402-c (as shown in FIG. 4C).

FIG. 4C illustrate modification of the content of ticker 404 in accordance with the system's determination that subject is attending and moving his or her locus of attention from 402-b (FIG. 4B) to 402-c. In particular, the system modifies the content of the ticker 404 by "dragging" the content back (e.g., reversing the scrolling of the ticker 404) in accordance with the locus of attention, thus allowing the subject to read content that he or she may have missed.

FIGS. 5A-5D illustrate a flow diagram of a method 500 for delivering content dynamically based on gaze analytics, in accordance with some embodiments. Method 500 is, optionally, governed by instructions that are stored in a computer memory or non-transitory computer readable storage medium (e.g., memory 212 in FIG. 2) and that are executed by one or more processors (e.g., processor(s) 202) of one or more computer systems, including, but not limited to, system 100 (FIG. 1) and/or system 200 (FIG. 2). The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. In various implementations, some operations of the method may be combined and/or the order of some operations may be changed from the order shown in the figures. Also, in some implementations, operations shown in separate figures and/or discussed in association with separate methods (e.g., method 600, FIG. 6 or method 700, FIG. 7) may be combined to form other methods, and operations shown in the same figure and/or discussed in association with the same method may be separated into different methods. Moreover, in some implementations, one or more operations in the methods are performed by modules of system 200 shown in FIG. 2, including, for example, processor(s) 202, user interface 204, memory 212, network interface 210, and/or any sub modules thereof.

In some implementations, method 500 is performed at a system including one or more processors and memory storing instructions for execution by the one or more processors (e.g., system 100 or system 200). Method 500 includes presenting (502) a subject with content. In some embodiments, the content includes (504) visual content displayed on a display. In some embodiments, the content includes (506) a plurality of sub-content tokens. For example, in some circumstances, the content is multimedia content and the sub-content tokens include video and audio frames. In some circumstances, the content includes text content that is presented either visually or aurally, and the sub-content tokens include words or groups of words (e.g., the words or groups of words are displayed, or, alternatively, rendered as speech using a text-to-speech engine).

While presenting the content to the subject, the system measures (508) one or more of the subject's eye positions. In some embodiments, measuring the one or more of the subject's eye positions includes (510) measuring the subject's right eye positions and measuring the subject's left eye positions. In some embodiments, measuring the subject's eye positions is accomplished (512) by using one or more video cameras. In accordance with these embodiments, FIG. 1 shows a system including digital video camera(s) 104 for measuring subject 102's eye positions.

The system continuously generates (514) a variability metric using the one or more measured eye positions. In this context, the term "continuously," means periodically generating new values of a respective metric at a rate of at least 5 Hz (i.e., five new values per second). In some embodiments, generating the variability metric using the one or more measured eye positions includes (516) comparing the measured right eye positions with the measured left eye positions. In some embodiments, generating the disconjugacy metric includes calculating a plurality of results of the difference of the position of the subject's right eye from the position of the subject's left eye (e.g., by subtracting the position of the subject's right eye from the position of the subject's left eye). In some embodiments, generating the disconjugacy metric includes calculating a variability (e.g., a dispersion, scatter, or spread) of the plurality of results, where each result corresponds to a distinct time. For example, in some embodiments, the disconjugacy metric corresponds to (518) a standard deviation of differences between the subject's right eye position and the subject's left eye position over a shifting window of time. In some embodiments, generating the disconjugacy metric includes generating a vertical metric and generating a horizontal metric, where generating a vertical metric includes measuring the difference between the subject's eyes along a vertical axis and generating a horizontal metric includes measuring the difference between the subject's eyes along a horizontal axis.

In some embodiments, the system compares the measured eye movements with a movement of a focus of the content. For example, the content may include a television program. In these circumstances, it is expected that a subject who is attending to the television program will track whichever actor in the television program is speaking. Thus, in some circumstances, the system will compare the measured eye movements to the movements of the speaking actors on the screen. The variability metric corresponds to how accurately and how consistently the subject visually tracks movement of the focus of content. To this end, in some embodiments, the system measures both of the subject's eye movements. Alternatively, in some embodiments, the system measures the eye movements of one of the subject's eyes (e.g., the subject's dominate eye).

In some embodiments, the variability metric (regardless of whether it is a disconjugacy metric or not) is generated (520) based on at least one of: a variability of eye position error metric, a variability of eye velocity gain metric, an eye position error metric, and a rate or number of saccades metric.

In any event, the system continuously compares (522) the variability metric with a predetermined baseline to determine an attention state of the subject. In some embodiments, the attention state is (524) one of an about-to-attend state, an attending state, or a not-attending state. For example, in some embodiments, the attending state corresponds to a low variability metric and indicates that the subject is fully attending to the presented content. In some implementations, the subject's attention state is the about-to-attend state when the variability metric is decreasing—indicating an increasing level of attention—and the variability metric is greater than the predetermined baseline but within a predetermined threshold of the predetermined baseline. In some implementations, the attention state is the not-attending state when the attention state is not the attending state. Alternatively, the attention is state is the not-attending state when the attention state is not the attending state or the about-to-attend state.

In some embodiments, the predetermined baseline is (526) based on at least one of: a variability range (e.g., a disconjugacy range) associated with a preselected group of control subjects (sometimes called a control group baseline), a demographic of the subject (e.g., an age range, a gender, a socio-economic status, etc.) and a variability metric (e.g., a disconjugacy metric) for the subject generated from a previous test (sometimes called an individual or personal baseline). For an example, an individual or personal baseline may be obtained by asking the individual to track a smoothly moving object on the display for a predefined period of time (e.g., 5 seconds, or 10 seconds), and using eye measurements obtained during the predefined period of time to generate the personal baseline (e.g., the predefined period of time comprises a personal baseline calibration period).

In some embodiments, the group of control subjects is composed of persons sharing a demographic of the subject. For example, the group of control subjects is composed of persons having a similar age and socioeconomic status as the subject. In some embodiments, the group of control subjects is composed of persons having a similar brain development level as the subject. In some embodiments, the group of control subjects is composed of persons of the same gender as the subject. In some accordance with some implementations, an increase in the variability metric over time may be indicative of fatigue, impaired mental state induced by drugs/alcohol, or waning attention level.

In some embodiments (e.g., when the content includes displayed visual content), the system continuously determines (528) a locus of attention on the display using the one or more measured eye positions. In some implementations, using the continuously determined locus of attention, the system determines (530) a trajectory of the locus of attention.

Upon detection of a change in the attention state, the system modifies (532) the presentation of the content. In some implementations, presentation of the content is modified (534) in accordance with both the change in attention state (532) and the continuously generated locus of attention. In some implementations, presentation of the content is modified (536) in accordance with both the change in attention state (532) and the trajectory of the locus of attention.

In some implementations (e.g., when the content includes a plurality of sub-content tokens), in accordance with the detection of the change in attention state (532) and a determination that the attention state is the not-attending state, the system statically presents (538) a first sub-content token. On the other hand, in accordance with the detection of the change in attention state (532) and a determination that the attention state is the attending state, the system transitions (540) through the plurality of sub-content tokens at a predefined rate (e.g., a constant rate, or a rate proportional to the numerical value of the variability metric). In either case, regardless of whether the determination is that the attention state is the attending state or the not-attending state, in some implementations, a first sub-content token of the plurality of sub-tokens includes (542) visual content displayed on a first region of the display and the plurality of sub-content tokens includes visual content displayed on a second region of the display that is larger than the first region. Furthermore, in some implementations, the pre-defined rate is (544) proportional to a numerical value of the variability metric, while in some other implementations, the predefined rate is (546) a constant rate of sub-content tokens per unit time.

In some implementations, the content includes (548) an advertisement. In accordance with a determination that the attention state is the attending state and that the locus of attention corresponds to the content, the system generates (550) a cost-per-action metric. In some implementations, the generated cost-per-action metric is generated (552) in accordance with a length of time that attention state is the attending state and a locus of attention corresponds to the content.

For example, in some implementations, a car advertisement is displayed in a respective region of the display. At first, the car advertisement is static, for example, showing an attractive picture of a new sports car. In this example, the attractive picture of the sports car serves as a "lure," attempting to attract the subject's attention to the respective region of the display in which the advertisement is displayed. Optionally, once the system determines that the trajectory of attention is leading towards the region of the display, the system modifies the advertisement by delivering audio content, for example, of an engine "revving sound," and showing the wheels of the sports car starting to spin (e.g., transitioning through sub-content tokens of the content, where the sub-content tokens include video frames of the wheels starting to spin). Once the system determines that the locus of attention is the respective region and that the subject's attention state is the attending state (e.g., the user is "hooked"), the system modifies the advertisement to show, for example, footage of the car being driven by a professional driver on a closed course. In some embodiments, the displayed speed of the car is inversely proportional to the variability metric (e.g., a lower level of variability generates a higher displayed car speed as compared to a higher level of variability).

Figure 6A:
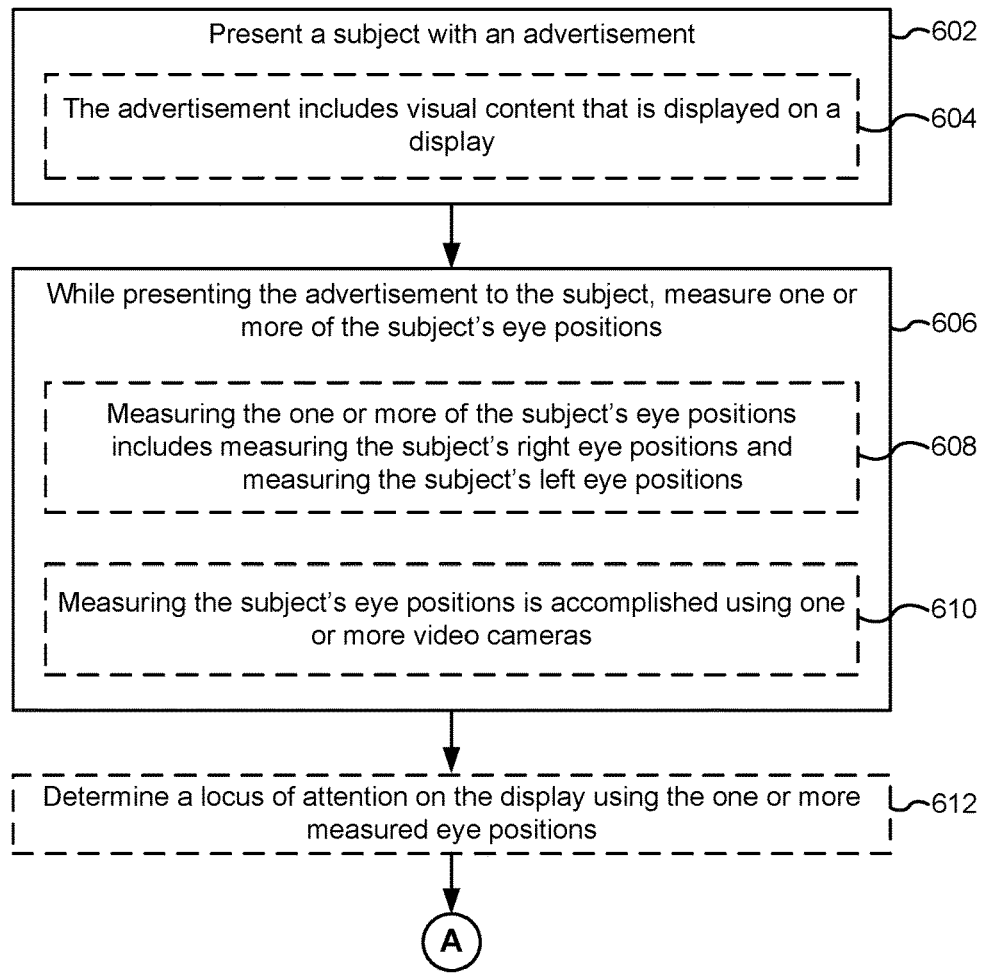
FIGS. 6A-6C illustrate a flow diagram of a method for generating a cost-per-action metric for advertising, in accordance with some embodiments.
Figure 6B:
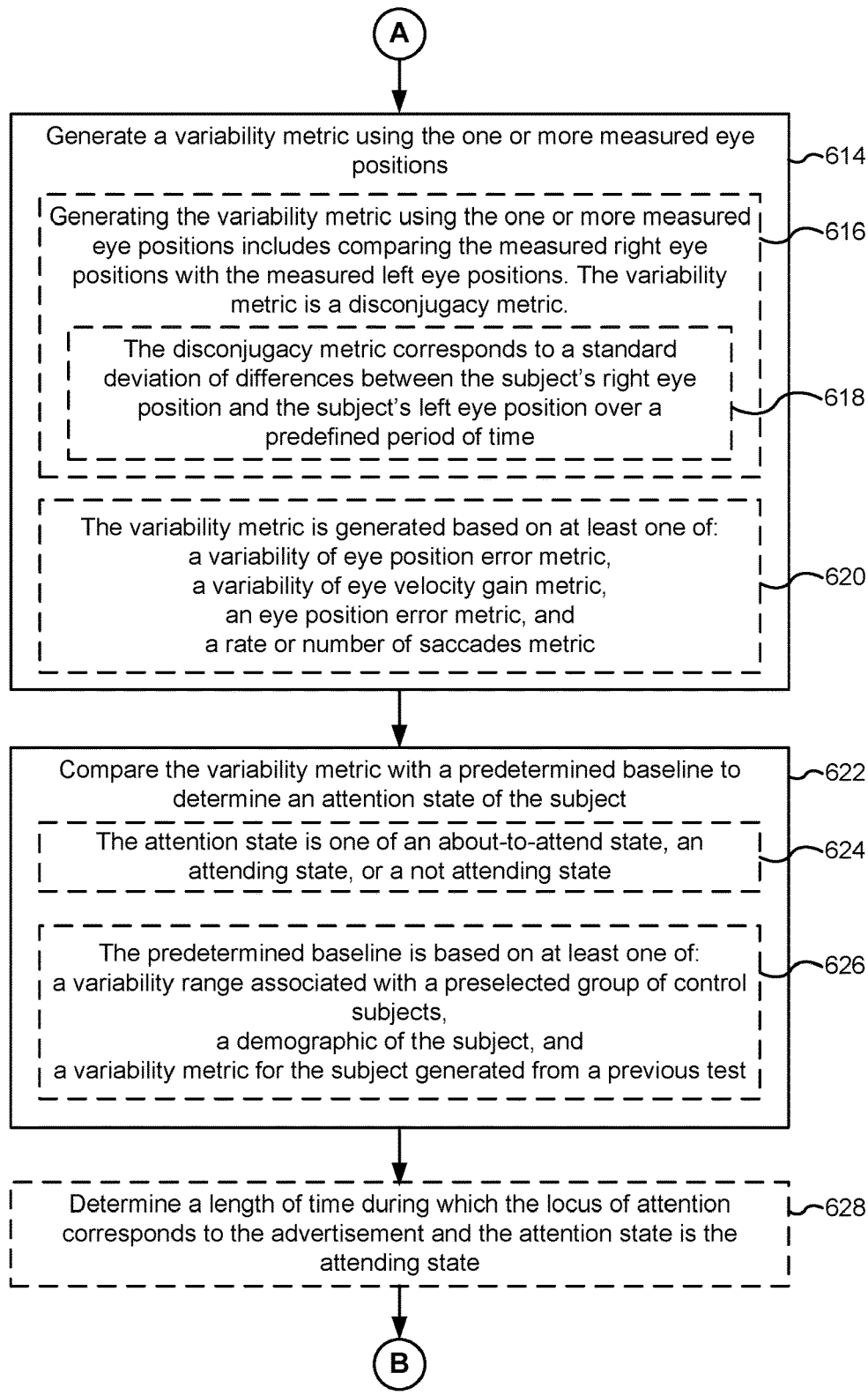
Figure 6C:
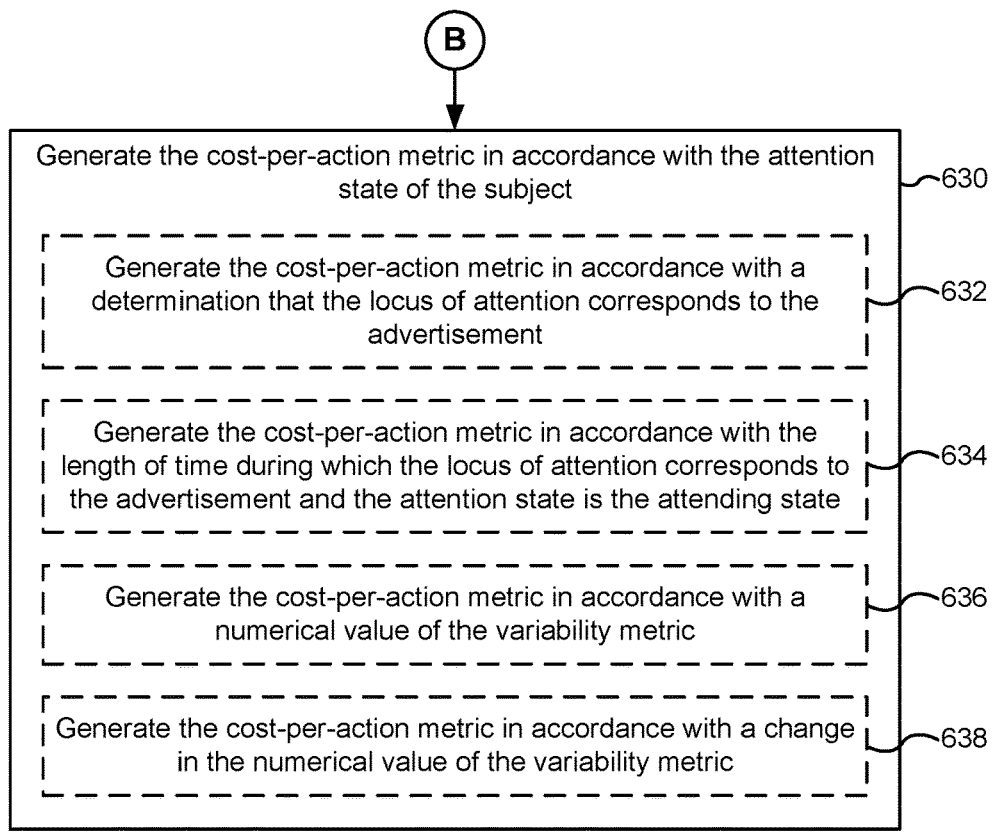

FIGS. 6A-6C illustrate a flow diagram of a method 600 for generating a cost-per-action metric for advertising, in accordance with some embodiments. The method is, optionally, governed by instructions that are stored in a computer memory or non-transitory computer readable storage medium (e.g., memory 212 in FIG. 2) and that are executed by one or more processors (e.g., processor(s) 202) of one or more computer systems, including, but not limited to, system 100 (FIG. 1) and/or system 200 (FIG. 2). The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. In various implementations, some operations in each method may be combined and/or the order of some operations may be changed from the order shown in the figures. Also, in some implementations, operations shown in separate figures and/or discussed in association with separate methods (e.g., method 500, FIG. 5 or method 700, FIG. 7) may be combined to form other methods, and operations shown in the same figure and/or discussed in association with the same method may be separated into different methods. Moreover, in some implementations, one or more operations in the methods are performed by modules of system 200 shown in FIG. 2, including, for example, processor(s) 202, user interface 204, memory 212, network interface 210, and/or any sub modules thereof.

In some implementations, method 600 is performed at a system including one or more processors and memory storing instructions for execution by the one or more processors (e.g., system 100 or system 200). Method 600 includes presenting (602) a subject with an advertisement. In some embodiments, the advertisement includes audio content, visual content (printed text, video, still frame images, etc.), tactile content, or a combination thereof. In particular, in some embodiments, the advertisement includes (604) visual content that is displayed on a display (e.g., a display of a smart-phone, tablet, personal computer, laptop computer, smart-television, or the like).

While presenting the advertisement to the subject, the system measures (606) one or more of the subject's eye positions. In some embodiments, measuring the one or more of the subject's eye positions includes (608) measuring the subject's right eye positions and measuring the subject's left eye positions. In some embodiments, measuring the subject's eye positions is accomplished (610) by using one or more video cameras. In accordance with these embodiments, FIG. 1 shows a system including digital video camera(s) 104 for measuring subject 102's eye positions.

In some embodiments (e.g., when the advertisement includes displayed visual content), the system continuously determines (612) a locus of attention on the display using the one or more measured eye positions.

The system generates (614) a variability metric using the one or more measured eye positions. In some embodiments, the variability metric is generated continuously (e.g., in real-time, at a periodic rate of no less than 5 Hz). In some embodiments, generating the variability metric using the one or more measured eye positions includes (616) comparing the measured right eye positions with the measured left eye positions. In such circumstances, the variability metric is a disconjugacy metric. In some embodiments, generating the disconjugacy metric includes calculating a plurality of results of the difference of the position of the subject's right eye from the position of the subject's left eye (e.g., by subtracting the position of the subject's right eye from the position of the subject's left eye). In some embodiments, generating the disconjugacy metric includes calculating a variability (e.g., a dispersion, scatter, or spread) of the plurality of results, where each result corresponds to a distinct time. For example, in some embodiments, the disconjugacy metric corresponds (618) to a standard deviation of differences between the subject's right eye position and the subject's left eye position over a shifting window of time. In some embodiments, generating the disconjugacy metric includes generating a vertical metric and generating a horizontal metric, where generating a vertical metric includes measuring the difference between the subject's eyes along a vertical axis and generating a horizontal metric includes measuring the difference between the subject's eyes along a horizontal axis.

In some embodiments, the system compares the measured eye movements with a movement of a focus of the advertisement. For example, the advertisement may include a video advertisement. In these circumstances, it is expected that a subject who is attending to the video advertisement will track whichever actor in the video advertisement is speaking. Thus, in some circumstances, the system will compare the measured eye movements to the movements of the speaking actors on the screen. As another example, the advertisement may be a video advertisement for a sports car racing around a closed course. In these circumstances, it is expected that a subject who is attending to the video advertisement will track the sports car. Thus, in some circumstances, the system will compare the measured eye movements to the movements of the sports car on the screen. The variability metric corresponds to how accurately and how consistently the subject visually tracks movement of the focus of advertisement. To this end, in some embodiments, the system measures both of the subject's eye movements. Alternatively, in some embodiments, the system measures the eye movements of one of the subject's eyes (e.g., the subject's dominate eye).

In some embodiments, the variability metric (regardless of whether it is a disconjugacy metric or not) is generated (620) based on at least one of: a variability of eye position error metric, a variability of eye velocity gain metric, an eye position error metric, and a rate or number of saccades metric.

Further, the system compares (622) the variability metric with a predetermined baseline to determine an attention state of the subject. In some embodiments, the comparison is performed continuously (e.g., in real-time). In some embodiments, the attention state is (624) one of an about-to-attend state, an attending state, or a not-attending state. For example, in some embodiments, the attending state corresponds to a low variability metric and indicates that the subject is fully attending to the presented advertisement. In some implementations, the subject's attention state is the about-to-attend state when the variability metric is decreasing—indicating an increasing level of attention—and the variability metric is greater than the predetermined baseline but within a predetermined threshold of the predetermined baseline. In some implementations, the attention state is the not-attending state when the attention state is not the attending state. Alternatively, the attention is state is the not-attending state when the attention state is neither the attending state nor the about-to-attend state.

In some embodiments, the predetermined baseline is (626) based on at least one of: a variability range (e.g., a disconjugacy range) associated with a preselected group of control subjects (sometimes called a control group baseline), a demographic of the subject (e.g., an age range, a gender, a socio-economic status, etc.), and a variability metric (e.g., a disconjugacy metric) for the subject generated from a previous test (sometimes called an individual or personal baseline). For an example, an individual or personal baseline may be obtained by asking the individual to track a smoothly moving object on the display for a predefined period of time (e.g., a period of less than 1 minute and no less than 5 seconds, such as 5 seconds, 10 seconds or 30 seconds), and using eye measurements obtained during the predefined period of time to generate the personal baseline (e.g., the predefined period of time comprises a personal baseline calibration period).

In some embodiments, the group of control subjects is composed of persons sharing a demographic of the subject. For example, the group of control subjects is composed of persons having a similar age and socioeconomic status as the subject. In some embodiments, the group of control subjects is composed of persons having a similar brain development level as the subject. In some embodiments, the group of control subjects is composed of persons of the same gender as the subject.

In some embodiments, the system determines (628) a length of time during which the locus of attention corresponds to the advertisement and the attention state is the attending state.

The system then generates (630) the cost-per-action metric in accordance with the attention state of the subject. In some embodiments, the system generates (632) the cost-per-action metric in accordance with a determination that the locus of attention corresponds to the advertisement (e.g., the subject is not only attending but attending to the advertisement). In some embodiments, the system generates (634) the cost-per-action metric in accordance with the length of time during which the locus of attention corresponds to the advertisement and the attention state is the attending state. In some embodiments, the system generates (636) the cost-per-action metric in accordance with a numerical value of the variability metric (e.g., the cost-per-action metric is generated based at least partially on a quality of the subject's attention level, for example, by generating a larger cost-per-action metric when the variability metric is lower, indicating a greater level of attention). In some embodiments, the system generates (638) the cost-per-action metric in accordance with a change in the numerical value of the variability metric (e.g., the cost-per-action metric is generated based on the advertisements ability to "grab" the subject's attention, for example, by increasing the cost-per-action metric when the variability metric decreases during the advertisement).

Figure 7A:
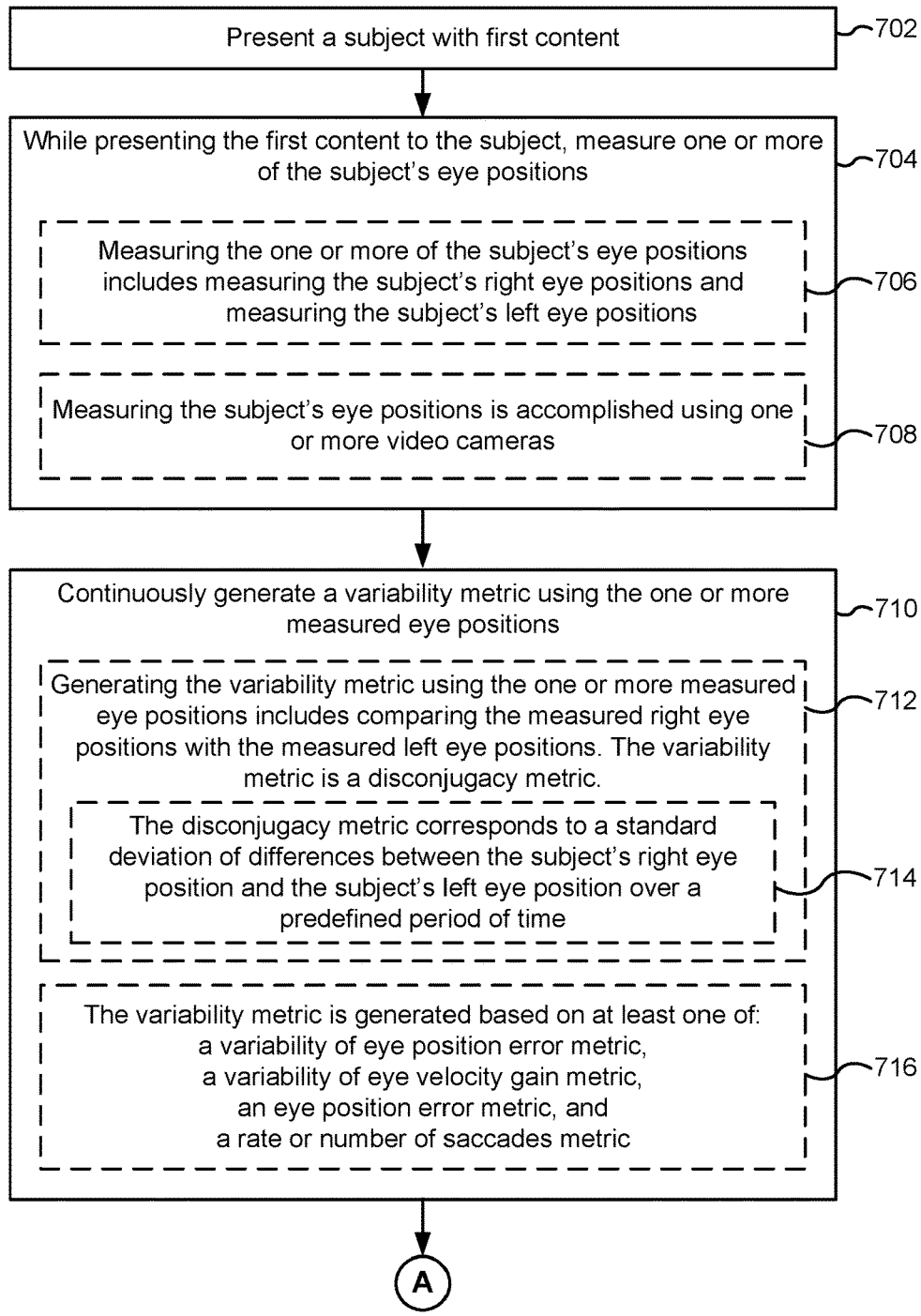
FIGS. 7A-7B illustrate a flow diagram of a method for delivering content dynamically based on gaze analytics, in accordance with some embodiments.
Figure 7B:
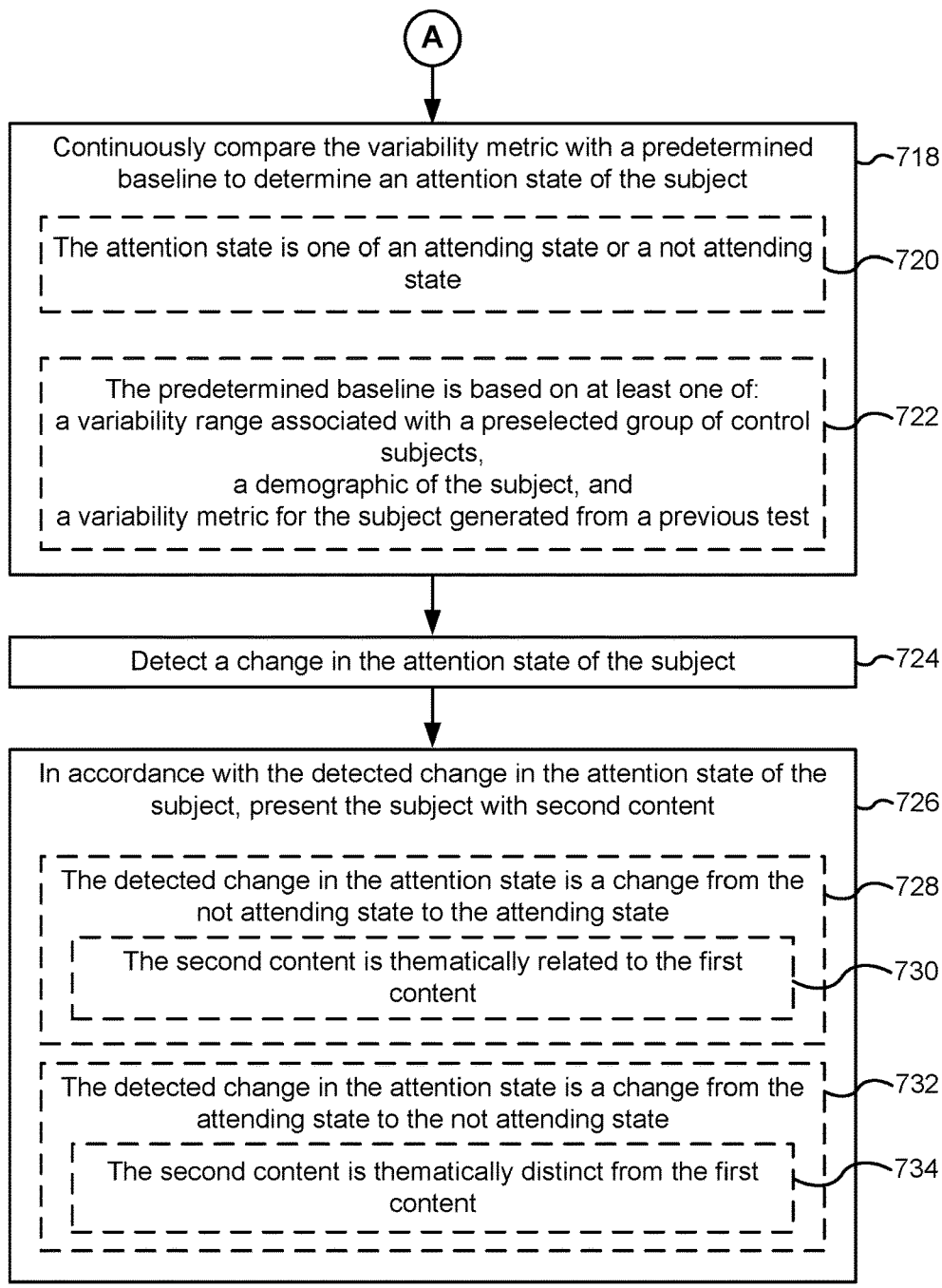

FIGS. 7A-7B illustrate a flow diagram of a method 700 for delivering content dynamically based on gaze analytics, in accordance with some embodiments. The method is, optionally, governed by instructions that are stored in a computer memory or non-transitory computer readable storage medium (e.g., memory 212 in FIG. 2) and that are executed by one or more processors (e.g., processor(s) 202) of one or more computer systems, including, but not limited to, system 100 (FIG. 1) and/or system 200 (FIG. 2). The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. In various implementations, some operations in each method may be combined and/or the order of some operations may be changed from the order shown in the figures. Also, in some implementations, operations shown in separate figures and/or discussed in association with separate methods (e.g., method 500, FIG. 5 or method 600, FIG. 6) may be combined to form other methods, and operations shown in the same figure and/or discussed in association with the same method may be separated into different methods. Moreover, in some implementations, one or more operations in the methods are performed by modules of system 200 shown in FIG. 2, including, for example, processor(s) 202, user interface 204, memory 212, network interface 210, and/or any sub modules thereof.

In some implementations, method 700 is performed at a system including one or more processors and memory storing instructions for execution by the one or more processors (e.g., system 100 or system 200). Method 700 includes presenting (702) a subject with first content. In some embodiments, the first content includes audio content, visual content (printed text, video, still frame images, etc.), tactile content, or a combination thereof. In particular, in some embodiments, the first content includes visual content that is displayed on a display (e.g., a display of a smartphone, tablet, personal computer, laptop computer, smart-television, or the like).

While presenting the first content to the subject, the system measures (704) one or more of the subject's eye positions. In some embodiments, measuring the one or more of the subject's eye positions includes (706) measuring the subject's right eye positions and measuring the subject's left eye positions. In some embodiments, measuring the subject's eye positions is accomplished (708) by using one or more video cameras. In accordance with these embodiments, FIG. 1 shows a system including digital video camera(s) 104 for measuring subject 102's eye positions.

The system continuously generates (710) a variability metric using the one or more measured eye positions. In some embodiments, generating the variability metric using the one or more measured eye positions includes (712) compare the measured right eye positions with the measured left eye positions. In such circumstances, the variability metric is a disconjugacy metric. In some embodiments, generating the disconjugacy metric includes calculating a plurality of results of the difference of the position of the subject's right eye from the position of the subject's left eye (e.g., by subtracting the position of the subject's right eye from the position of the subject's left eye). In some embodiments, generating the disconjugacy metric includes calculating a variability (e.g., a dispersion, scatter, or spread) of the plurality of results, where each result corresponds to a distinct time. For example, in some embodiments, the disconjugacy metric corresponds (714) to a standard deviation of differences between the subject's right eye position and the subject's left eye position over a shifting window of time. In some embodiments, generating the disconjugacy metric includes generating a vertical metric and generating a horizontal metric, where generating a vertical metric includes measuring the difference between the subject's eyes along a vertical axis and generating a horizontal metric includes measuring the difference between the subject's eyes along a horizontal axis.

In some embodiments, the system compares the measured eye movements with a movement of a focus of the content. For example, the content may include a television program. In these circumstances, it is expected that a subject who is attending to the television program will track whichever actor in the television program is speaking. Thus, in some circumstances, the system will compare the measured eye movements to the movements of the speaking actors on the screen. The variability metric corresponds to how accurately and how consistently the subject visually tracks movement of the focus of content. To this end, in some embodiments, the system measures both of the subject's eye movements. Alternatively, in some embodiments, the system measures the eye movements of one of the subject's eyes (e.g., the subject's dominate eye).

In some embodiments, the variability metric (regardless of whether it is a disconjugacy metric or not) is generated (716) based on at least one of: variability of an eye position error metric, variability of an eye velocity gain metric, an eye position error metric, and a rate or number of saccades metric.

Further, the system continuously compares (718) the variability metric with a predetermined baseline to determine an attention state of the subject. In some embodiments, the attention state is (720) one of an about-to-attend state, an attending state, or a not attending state. For example, in some embodiments, the attending state corresponds to a low variability metric and indicates that the subject is fully attending to the presented content. In some implementations, the subject's attention state is the about-to-attend state when the variability metric is decreasing—indicating an increasing level of attention—and the variability metric is greater than the predetermined baseline but within a predetermined threshold of the predetermined baseline. In some implementations, the attention state is the not-attending state when the attention state is not the attending state. Alternatively, the attention is state is the not-attending state when the attention state is neither the attending state nor the about-to-attend state.

In some embodiments, the predetermined baseline is (722) based on at least one of: a variability range (e.g., a disconjugacy range) associated with a preselected group of control subjects (sometimes called a control group baseline), a demographic of the subject (e.g., an age range, a gender, a socio-economic status, etc.), and a variability metric (e.g., a disconjugacy metric) for the subject generated from a previous test (sometimes called an individual or personal baseline). For an example, an individual or personal baseline may be obtained by asking the individual to track a smoothly moving object on the display for a predefined period of time (e.g., a period of less than 1 minute and no less than 5 seconds, such as 5 seconds, 10 seconds or 30 seconds), and using eye measurements obtained during the predefined period of time to generate a personal baseline (e.g., the predefined period of time comprises a personal baseline calibration period).

In some embodiments, the group of control subjects is composed of persons sharing a demographic of the subject. For example, the group of control subjects is composed of persons having a similar age and socioeconomic status as the subject. In some embodiments, the group of control subjects is composed of persons having a similar brain development level as the subject. In some embodiments, the group of control subjects is composed of persons of the same gender as the subject. In some accordance with implementations, an increase in the variability metric over time may be indicative of fatigue, impaired mental state induced by drugs/alcohol, or waning attention level.

In any event, the system detects (724) a change in the attention state of the subject. In accordance with the detected change in the attention state of the subject, the system presents (726) the subject with second content.

In some circumstances, the detected change in the attention state is (728) a change from the not-attending state to the attending state. In some such circumstances, the change in the attention state is indicative of the content "grabbing" the user's attention, which is, in turn, indicative that the subject has an interest in the subject matter of the content. Thus, in some circumstances, the second content is thematically related (730) to the first content. For example, the system may present a series of advertisements on a variety of different products. During a respective advertisement, if the system detects a change from the not-attending state to the attending state, in some embodiments the system will present a subsequent advertisement that is thematically related to respective advertisement. For example, the respective advertisement and the subsequent advertisement can be for similar products. Alternatively, or in addition, the respective advertisement and the subsequent advertisement can be related in that they are targeted to a common demographic (e.g., an advertisement for music that targets a particular demographic may be followed by an advertisement for clothes that targets the same demographic).

In some circumstances, the detected change in the attention state is (732) a change from the attending state to the not-attending state. In some such circumstances, the change in the attention state is indicative of the content losing the user's attention, which is, in turn, indicative that the subject has little if any interest in the subject matter of the content. Thus, in some circumstances, the second content is thematically distinct (734) from the first content.

In some circumstances, the second content is provided soon after the first content (e.g., the second content interrupts the first content, is provided concurrently, or follows immediately after). In some embodiments, the detected change in the attention state is used to update a profile of the subject, which may be stored on the system or a server (e.g., an advertisement server). The profile of the subject is, in some embodiments, used for targeted content delivery (e.g., targeted advertising). In some circumstances, the second content is provided a substantial amount of time after the first content (e.g., an hour later, a day later, a week later, etc.) in accordance with the updated profile of the subject (and hence, in accordance with the detected change in the subject's attention state while the first content is being provided).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

It will be understood that, although the terms "first," "second," etc. may be used herein to describe various elements, these elements should not be limited by these terms. These terms are only used to distinguish one element from another. For example, a first sound detector could be termed a second sound detector, and, similarly, a second sound detector could be termed a first sound detector, without changing the meaning of the description, so long as all occurrences of the "first sound detector" are renamed consistently and all occurrences of the "second sound detector" are renamed consistently. The first sound detector and the second sound detector are both sound detectors, but they are not the same sound detector.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "upon a determination that" or "in response to determining" or "in accordance with a determination" or "upon detecting" or "in response to detecting" that the stated condition precedent is true, depending on the context.

What is claimed is:

1. A method of presenting content to a subject based on eye position measurements, comprising:
    presenting the subject with content;
    while presenting the content to the subject:
        measuring one or more of the subject's eye positions;
        continuously performing the operations of:
            generating an attention metric using the one or more measured eye positions;
            based on the attention metric, determining an attention state of the subject;
        determining a locus of attention using the one or more measured eye positions;
        determining a trajectory of the locus of attention; and
        in accordance with the attention state of the subject being an attending state, modifying the presentation of the content based on the trajectory of the locus of attention so as to present different content than if the attention state of the subject were a not attending state.

2. The method of claim 1, wherein:
    the presentation of the content is modified in accordance with detecting a change in the attention state of the subject from the not attending state to the attending state; and
    the content is modified, based on the trajectory of the one or more eye positions, so as to present different content than if the attention state of the subject had remained in the not attending state.

3. The method of claim 2, wherein:
before detecting the change in the attention state of the subject, the content is provided statically; and
modifying the content comprises transitioning through the content at a rate corresponding to a numerical value of the attention metric.

4. The method of claim 2, wherein:
before detecting the change in the attention state of the subject, the content is provided statically; and
modifying the content comprises transitioning through the content at a predefined constant rate.

5. The method of claim 1, wherein:
presenting the subject with the content includes displaying visual content on a display; and
modifying the presentation of the content based on the trajectory of the locus of attention includes modifying the presentation of the visual content at a location on the display that is selected based on the trajectory of the locus of attention.

6. The method of claim 1, wherein:
the content includes an advertisement; and
the method further includes generating a cost-per-action metric.

7. The method of claim 1, wherein the attention metric is a variability metric.

8. The method of claim 1, wherein the attention state of the user, over time, is one of an about-to-attend state, the attending state, or the not attending state.

9. The method of claim 1, wherein modifying the presentation of the content based on the trajectory of the locus of attention includes modifying the presentation of the content in accordance with a determination that the locus of attention is moving toward the content.

10. A system for presenting content to a subject based on eye position measurements, comprising:
one or more sensors for measuring one or more of the subject's eye positions;
one or more processors;
memory; and
one or more programs stored in the memory, the one or more programs comprising instructions that when executed by the one or more processors cause the system to:
present the subject with content;
while presenting the content to the subject:
measure one or more of the subject's eye positions;
continuously perform the operations of:
generating an attention metric using the one or more measured eye position;
based on the attention metric, determining an attention state of the subject;
determining a locus of attention using the one or more measured eye positions;
determining a trajectory of the locus of attention; and
in accordance with the attention state of the subject being an attending state, modify the presentation of the content based on the trajectory of the locus of attention, so as to present different content than if the attention state of the subject were a not attending state.

11. The system of claim 10, wherein:
the presentation of the content is modified in accordance with detecting a change in the attention state of the subject from the not attending state to the attending state; and
the content is modified, based on the trajectory of the locus of attention, so as to present different content than if the attention state of the subject had remained in the not attending state.

12. The system of claim 11, wherein:
before detecting the change in the attention state of the subject, the content is provided statically; and
modifying the content comprises transitioning through the content at a rate corresponding to a numerical value of the attention metric.

13. The system of claim 11, wherein:
before detecting the change in the attention state of the subject, the content is provided statically; and
modifying the content comprises transitioning through the content at a predefined constant rate.

14. The system of claim 10, wherein:
presenting the subject with the content includes displaying visual content on a display; and
modifying the presentation of the content based on the trajectory of the locus of attention includes modifying the presentation of the visual content at a location on the display that is selected based on the trajectory of the locus of attention.

15. The system of claim 10, wherein:
the content includes an advertisement; and
the one or more programs comprise instructions that cause the system to generate a cost-per-action metric.

16. The system of claim 10, wherein the attention metric is a variability metric.

17. The system of claim 10, wherein the attention state is one of an about-to-attend state, the attending state, or the not attending state.

18. The system of claim 10, wherein modifying the presentation of the content based on the trajectory of the locus of attention includes modifying the presentation of the content in accordance with a determination that the locus of attention is moving toward the content.

19. A non-transitory computer readable storage medium storing one or more programs, the one or more programs comprising instructions, which when executed by an electronic system with one or more sensors for measuring eye position, cause the system to:
present the subject with content;
while presenting the content to the subject:
measure one or more of the subject's eye positions;
continuously perform the operations of:
generating an attention metric using the one or more measured eye positions;
based on the attention metric, determining an attention state of the subject; and
determining a locus of attention using the one or more measured eye positions;
determining a trajectory of the locus of attention; and
in accordance with the attention state of the subject being an attending state, modify the presentation of the content based on the trajectory of the locus of attention so as to present different content than if the attention state of the subject were a not attending state.

20. The non-transitory computer readable storage medium of claim 19, wherein modifying the presentation of the content based on the trajectory of the locus of attention includes modifying the presentation of the content in accordance with a determination that the locus of attention is moving toward the content.

* * * * *

UNITED STATES PATENT AND TRADEMARK OFFICE
CERTIFICATE OF CORRECTION

PATENT NO. : 10,365,714 B2  
APPLICATION NO. : 15/967440  
DATED : July 30, 2019  
INVENTOR(S) : Ghajar Page 1 of 1

It is certified that error appears in the above-identified patent and that said Letters Patent is hereby corrected as shown below:

In the Claims

Claim 10, Column 21, Line 49, please delete "eye position;" and insert --eye positions;--;

Claim 19, Column 22, Line 43, please delete "present the subject" and insert --present a subject--.

Signed and Sealed this  
Eighth Day of October, 2019

Andrei Iancu  
*Director of the United States Patent and Trademark Office*